(12) United States Patent
Yoshimuta

(10) Patent No.: US 11,671,713 B2
(45) Date of Patent: Jun. 6, 2023

(54) IMAGING APPARATUS, TRANSMITTANCE DESIGNATION DEVICE, TRANSMITTANCE CONTROL METHOD, AND PROGRAM

(71) Applicant: Sony Group Corporation, Tokyo (JP)

(72) Inventor: Junki Yoshimuta, Tokyo (JP)

(73) Assignee: Sony Group Corporation, Tokyo (JP)

( * ) Notice: Subject to any disclaimer, the term of this patent is extended or adjusted under 35 U.S.C. 154(b) by 5 days.

(21) Appl. No.: 17/610,292

(22) PCT Filed: Feb. 25, 2020

(86) PCT No.: PCT/JP2020/007432
§ 371 (c)(1),
(2) Date: Nov. 10, 2021

(87) PCT Pub. No.: WO2020/235166
PCT Pub. Date: Nov. 26, 2020

(65) Prior Publication Data
US 2022/0217259 A1    Jul. 7, 2022

(30) Foreign Application Priority Data
May 21, 2019  (JP) .............................. JP2019-095174

(51) Int. Cl.
*G03B 11/00* (2021.01)
*H04N 23/72* (2023.01)
*H04N 23/71* (2023.01)

(52) U.S. Cl.
CPC ............. *H04N 23/72* (2023.01); *H04N 23/71* (2023.01)

(58) Field of Classification Search
CPC ........ H04N 23/72; H04N 23/71; H04N 23/75; H04N 23/00; G03B 11/00; G03B 17/12
See application file for complete search history.

(56) References Cited

U.S. PATENT DOCUMENTS

2014/0313600 A1  10/2014  Kanayama et al.
2015/0281547 A1*  10/2015  Terasawa ............. H04N 23/745
348/226.1
(Continued)

FOREIGN PATENT DOCUMENTS

JP  2005-294988 A  10/2005
JP  2007-243928 A   9/2007
(Continued)

OTHER PUBLICATIONS

International Search Report dated Mar. 31, 2020 in PCT/JP2020/007432 filed Feb. 25, 2020, 2 pages.

*Primary Examiner* — Mekonnen D Dagnew
(74) *Attorney, Agent, or Firm* — Oblon, McClelland, Maier & Neustadt, L.L.P.

(57) ABSTRACT

An imaging apparatus includes a variable neutral density filter that has a variable transmittance; an imaging device on which object light via the variable neutral density filter forms an image; variable transmittance drive circuitry that changes the transmittance of the variable neutral density filter in accordance with a transmittance control value; a hardware input device that can be in a first state or in a second state depending on a change in form; and transmittance designation circuitry. Further, when the hardware input device is in the first state, the transmittance designation sets the transmittance control value in accordance with an operation amount of the hardware input device and notifies the variable transmittance drive circuitry of the transmittance control value.

18 Claims, 23 Drawing Sheets

(56) References Cited

U.S. PATENT DOCUMENTS

| | | | | |
|---|---|---|---|---|
| 2017/0339326 | A1* | 11/2017 | Rycenga | H04N 23/75 |
| 2018/0299663 | A1* | 10/2018 | Sato | G02B 27/0018 |
| 2021/0006701 | A1* | 1/2021 | Sakurabu | G03B 13/36 |

FOREIGN PATENT DOCUMENTS

| | | |
|---|---|---|
| JP | 2012-5027 A | 1/2012 |
| JP | 2016-95451 A | 5/2016 |
| WO | WO 2013/047591 A1 | 4/2013 |

* cited by examiner

FIG. 2
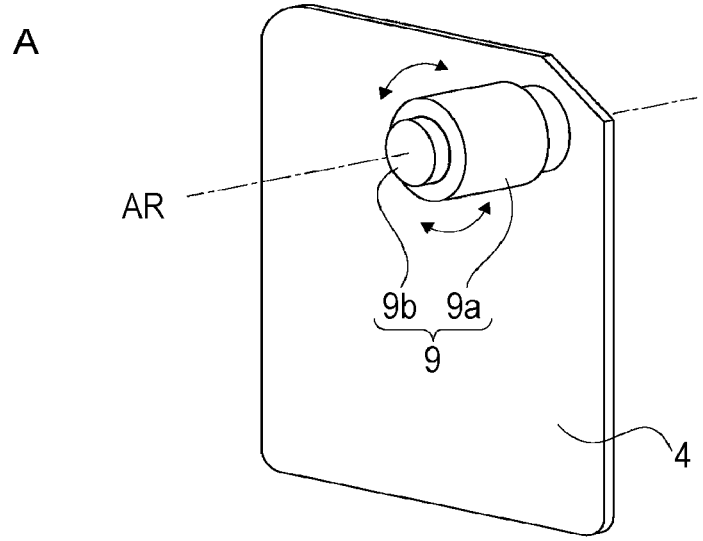
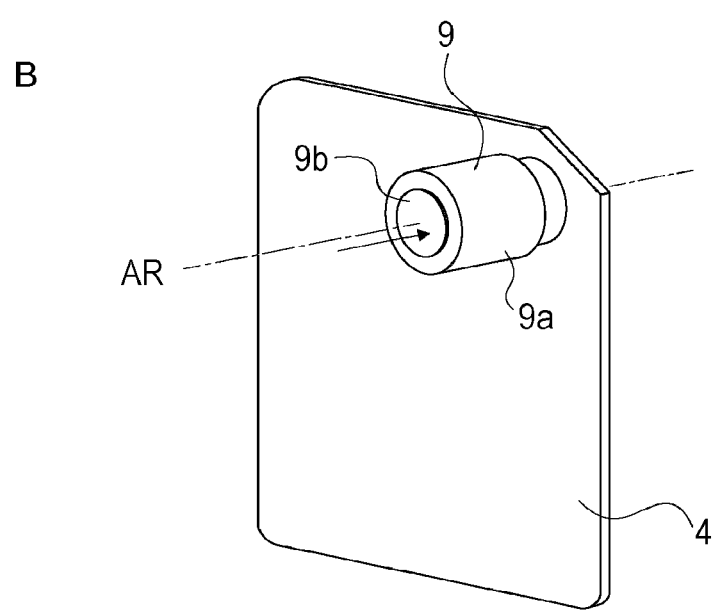

FIG. 9
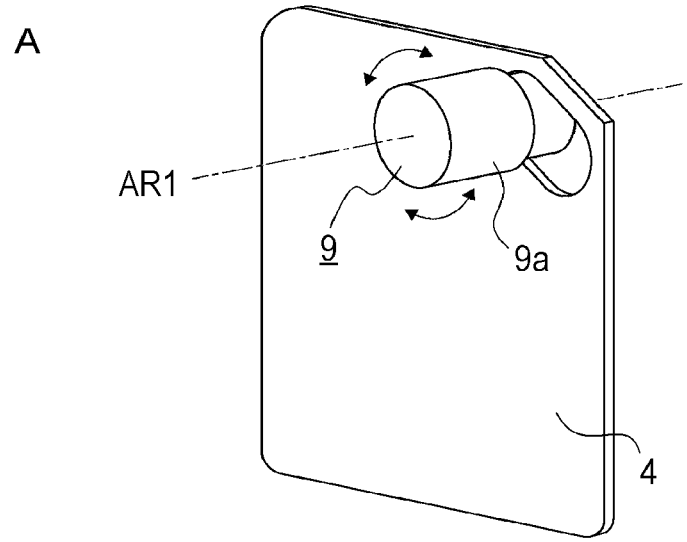
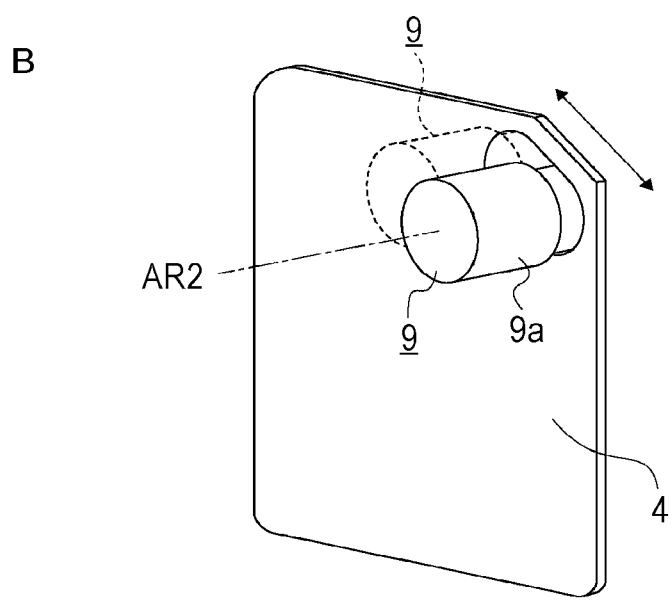

FIG. 13
A
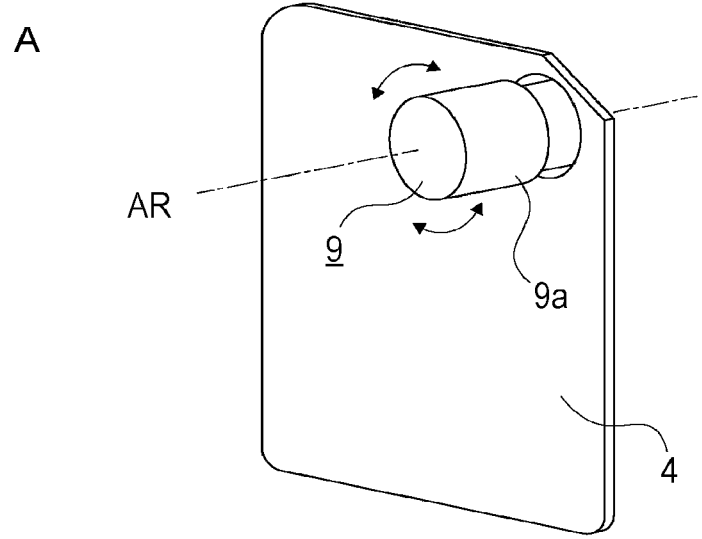
B
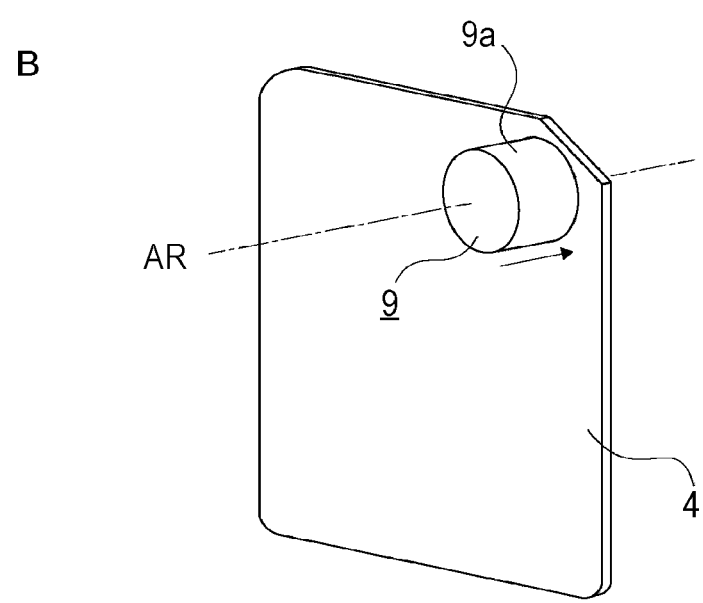

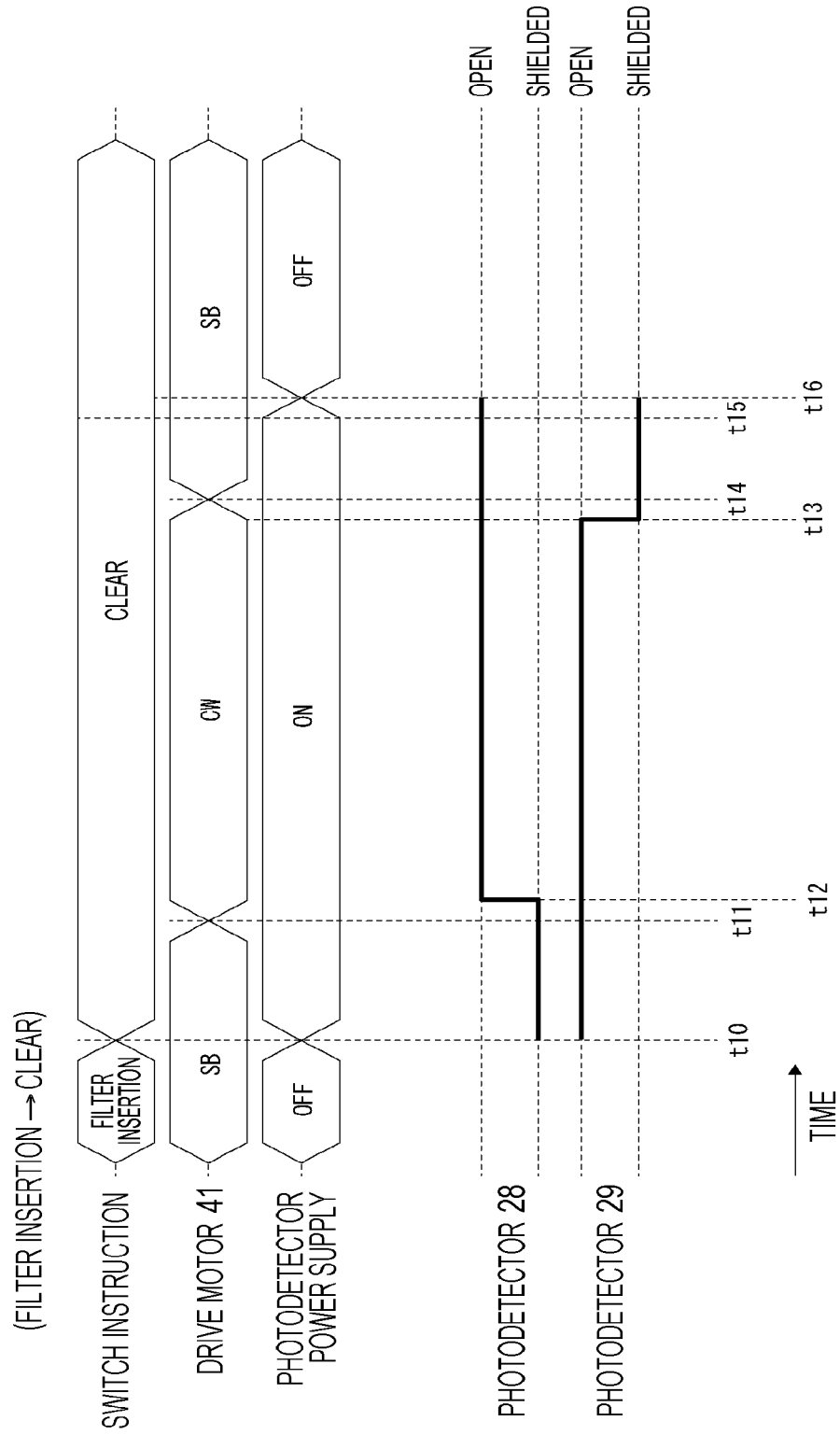

IMAGING APPARATUS, TRANSMITTANCE DESIGNATION DEVICE, TRANSMITTANCE CONTROL METHOD, AND PROGRAM

TECHNICAL FIELD

The present technology relates to an imaging apparatus, a transmittance designation device, a transmittance control method, and a program, and more particularly, to variable transmittance control on a filter of an imaging apparatus.

BACKGROUND ART

In an imaging apparatus, as a means for changing the quantity of incident light without changing the aperture size of the diaphragm, there is a neutral density (ND) filter that reduces light by inserting a filter having a certain transmittance into the light path.

For example, Patent Document 1 discloses an apparatus in which a plurality of fixed transmittance ND filters having different transmittances from one another is arranged in a turret structure, and the turret is rotated in conjunction with a user operation to obtain a plurality of light reduction variations. The operation system in this case adopts a position switch, for example, and its positions are associated with rotational positions of the turret.

Meanwhile, variable transmittance ND filters are also known, and in the case of a variable transmittance ND filter, the voltage to be applied to the electrode of the ND filter is changed, so as to provide a plurality of light reduction variations. As the operation system in that case, a stepless dial is adopted, for example, and amounts of rotation of the dial are associated with amounts of change in transmittance (applied voltage values).

CITATION LIST

Patent Document

Patent Document 1: Japanese Patent Application Laid-Open No. 2016-95451

SUMMARY OF THE INVENTION

Problems to be Solved by the Invention

Meanwhile, an imaging apparatus equipped with a variable transmittance ND filter can have not only a mode (variable mode) in which the transmittance is continuously changed by a stepless dial, for example, but also a mode (preset mode) in which a plurality of discrete transmittances is preset beforehand, and the preset transmittances are designated by a position switch, for example. As these modes can be used in a switching manner, it is possible to provide the user with an environment for transmittance changing operations depending on the situations.

However, since the variable mode and the preset mode are prepared, it is necessary to provide operating units suitable for the respective modes, resulting in a complicated operation system.

With a complicated operation system, a transmittance operation during imaging is not easy.

Particularly when a camera operator is capturing an image while holding imaging apparatus, the camera operator normally gazes at the object on a display unit such as a viewfinder or a liquid crystal monitor. Therefore, it is difficult for the camera operator to find a dial or a button for a transmittance changing operation or mode switching, and an erroneous operation is likely to occur.

Therefore, the present disclosure suggests a technology for maintaining excellent operability while providing a plurality of modes for transmittance changing operations.

Solutions to Problems

An imaging apparatus according to the present technology includes: a variable neutral density filter that has a variable transmittance; an imaging device unit on which object light via the variable neutral density filter forms an image; a variable transmittance drive unit that changes the transmittance of the variable neutral density filter in accordance with a transmittance control value; an operating unit that can be in a first state or in a second state depending on a change in form; and a transmittance designation unit that sets a transmittance control value directed to the variable transmittance drive unit in accordance with an operation amount of the operating unit when the operating unit is in the first state, and selects one transmittance control value from among a plurality of transmittance control values in accordance with an operation of the operating unit and sets the one transmittance control value as the transmittance control value directed to the variable transmittance drive unit when the operating unit is in the second state, the plurality of transmittance control values being stored as preset memory.

That is, the form of the operating unit changes between the first state and the second state. The method for setting the transmittance to be designated varies depending on the first state and the second state.

Changes in the form of the operating unit include a change in appearance, a change in shape, a change in position, a change in internal mechanism state, with respect to all or part of the operating unit.

The transmittance control value is only required to be a value designating a specific transmittance, or may be the transmittance, or may be a control value for the variable transmittance drive unit to achieve a target transmittance, instead of the transmittance.

In the above imaging apparatus according to the present technology, when the operating unit is in the first state, the transmittance designation unit may set the transmittance control value directed to the variable transmittance drive unit in accordance with an operation amount of a specific operation of the operating unit. Further, when the operating unit is in the second state, the transmittance designation unit may select one transmittance control value from among the plurality of transmittance control values in accordance with the specific operation of the operating unit and set the one transmittance control value as the transmittance control value directed to the variable transmittance drive unit, the plurality of transmittance control values being stored as the preset memory.

In both cases of the first information and the second state, the same specific operation is the operation for changing the transmittance.

In the above imaging apparatus according to the present technology, the operating unit may include a rotating member, and the specific operation may be an operation to rotate the rotating member.

In both cases of the first information and the second state, a rotating operation is the operation for changing the transmittance.

The above imaging apparatus according to the present technology may further include a preset memory unit that stores the plurality of transmittance control values as the preset memory in a rewritable state.

The preset memory unit stores a plurality of values as transmittance control values.

The above imaging apparatus according to the present technology may further include a preset memory unit that stores the plurality of transmittance control values as the preset memory. In this imaging apparatus, when the operating unit is switched from the first state to the second state, the transmittance designation unit may select one transmittance control value stored in the preset memory unit.

As the operating unit is switched to the second state, a certain preset value is selected, and the transmittance of the variable neutral density filter is controlled.

In the above imaging apparatus according to the present technology, when the operating unit is switched from the first state to the second state, the transmittance designation unit may select the preset number that was selected at last when the operating unit was in the second state last time, and notify the variable transmittance drive unit of the transmittance control value that is stored and is associated with the preset number in the preset memory unit.

That is, when the operating unit is switched to the second state, the state of the last preset number in the previous second state continues.

In the above imaging apparatus according to the present technology, when the operating unit is switched from the first state to the second state, the transmittance designation unit may notify the variable transmittance drive unit of the transmittance control value that is stored and is associated with the preset number that was selected at last when the operating unit was in the second state last time.

That is, when the operating unit is switched to the second state, the state of the last transmittance control value in the previous second state continues.

In the above imaging apparatus according to the present technology, when the operating unit is switched from the first state to the second state, the transmittance designation unit may select the transmittance control value closest to the transmittance control value that was directed to the variable transmittance drive unit in the most recent first state from among the transmittance control values stored in the preset memory unit, and notify the variable transmittance drive unit of the selected transmittance control value.

That is, when the operating unit is switched to the second state, a state close to the transmittance control value in the most recent first state continues.

The above imaging apparatus according to the present technology, may further include: a light quantity detection unit that detects a light quantity of the object light; an exposure amount calculation unit that calculates a transmittance as a target exposure amount, from the light quantity detected by the light quantity detection unit; and a preset memory unit that stores the plurality of transmittance control values as the preset memory in a rewritable state. In this imaging apparatus, the transmittance designation unit may perform a process of causing the preset memory unit to store the transmittance control value for designating the transmittance calculated by the exposure amount calculation unit.

That is, the transmittance control value in the preset mode is rewritten to the value for achieving a desired transmittance.

In the above imaging apparatus according to the present technology, the transmittance designation unit may associate the transmittance control value for designating the transmittance calculated by the exposure amount calculation unit with the preset number that is the substantial median of preset numbers prepared in a selectable manner, cause the preset memory unit to store the transmittance control value associated with the preset number as the substantial median, and update the transmittance control values corresponding to the preset numbers other than the substantially median preset number on the basis of the transmittance control value corresponding to the substantial median.

That is, in a case where "1" to "9" are prepared as the preset numbers, for example, the transmittance control value for setting a desired transmittance is associated with "5" as the median value and is stored.

In the above imaging apparatus according to the present technology, the transmittance designation unit may cause the preset memory unit to store the transmittance control value for designating the transmittance calculated by the exposure amount calculation unit, and notify the variable transmittance drive unit of the transmittance control value.

That is, when the operating unit is switched to the second state, the transmittance control value in the preset mode is rewritten to the value for setting a desired transmittance, and the variable transmittance drive unit is instructed to set a state with the desired transmittance.

In the above imaging apparatus according to the present technology, the operating unit may include: a rotating member; and a pressing portion that is provided on the rotating member, and the first state and the second state may be states in which pressed states of the pressing portion are different.

The pressing portion is provided on the rotating member, so that the first information and the second state are switched by a pressing operation of the pressing portion. For example, the pressing positional state of the pressing portion varies.

In the above imaging apparatus according to the present technology, the operating unit may include a rotating member, and the second state may be a state in which the rotating member is moved in the rotation axis direction relative to the first state.

In this structure, the rotating member moves in the axial direction, to enter the first state or the second state.

In the above imaging apparatus according to the present technology, the operating unit may include a rotating member, and the second state may be a state in which the rotating member is moved so that the rotation axis position of the rotating member changes relative to the first state.

In this structure, the rotating member moves in a direction perpendicular to the axial direction, to enter the first state or the second state.

In the above imaging apparatus according to the present technology, the operating unit may generate a clicking feeling for each predetermined operation amount in the second state, and the transmittance designation unit may change the transmittance control value directed to the variable transmittance drive unit with another transmittance control value at a clicking timing.

For example, in an operation of the rotating member, a click is generated for each predetermined amount.

A transmittance designation device according to the present technology includes a transmittance designation unit. When an operating unit that can be in a first state or in a second state depending on a change in form is in the first state, the transmittance designation unit sets a transmittance control value for controlling a variable neutral density filter having a variable transmittance in accordance with an operation amount of the operating unit. When the operating unit is in the second state, the transmittance designation unit selects the transmittance control value for controlling the variable neutral density filter in accordance with an operation of the operating unit from among a plurality of transmittance control values stored as preset memory.

It is assumed that a device such as a microcomputer in the imaging apparatus, an operation device (such as a remote controller, for example) independent of the imaging apparatus, or the like may function as the transmittance designation device.

A transmittance control method according to the present technology is implemented in an imaging apparatus that includes: a variable neutral density filter that has a variable transmittance; an imaging device unit on which object light via the variable neutral density filter forms an image; a variable transmittance drive unit that changes a transmittance of the variable neutral density filter in accordance with a transmittance control value; and an operating unit that can be in a first state or in a second state depending on a change in form. The transmittance control method includes: setting the transmittance control value in accordance with an operation amount of the operating unit and notifying the variable transmittance drive unit of the transmittance control value when the operating unit is in the first state; and selecting one transmittance control value from among a plurality of transmittance control values in accordance with an operation of the operating unit and notifying the variable transmittance drive unit of the one transmittance control value when the operating unit is in the second state, the plurality of transmittance control values being stored as preset memory.

With this configuration, it is possible to perform transmittance operations in the respective modes, using the single operating unit that switches between the first state and the second state.

A program according to the present technology causes an information processing device to perform: a process of setting a transmittance control value for a variable neutral density filter having a variable transmittance in accordance with an operation amount of an operating unit, when the operating unit that can be in a first state or in a second state depending on a change in form is in the first state; and a process of selecting the transmittance control value for the variable neutral density filter in accordance with an operation of the operating unit from among a plurality of transmittance control values stored as preset memory, when the operating unit is in the second state.

It is assumed that an information processing device such as a microcomputer in the imaging apparatus, an information processing device in an operation device (such as a remote controller, for example) independent of the imaging apparatus, or the like operates according to such a program.

BRIEF DESCRIPTION OF DRAWINGS

FIG. 2 is diagrams for explaining operations of a transmittance operator according to an embodiment.

FIG. 9 is diagrams for explaining operations of a transmittance operator according to a fourth embodiment.

FIG. 13 is diagrams for explaining operations of a transmittance operator according to a fifth embodiment.

FIG. 23 is a chart for explaining an operation at a time of removal of a variable neutral density filter according to an embodiment.

MODES FOR CARRYING OUT THE INVENTION

Embodiments will be described below in the following order.

<1. Configuration of an Imaging Apparatus According to a First Embodiment>
<2. Comparative Examples>
<3. Example Process According to the First Embodiment>
<4. Second Embodiment>
<5. Third Embodiment>
<6. Fourth Embodiment>
<7. Fifth Embodiment>
<8. Sixth Embodiment>
<9. Optical Block Mechanism Including a Variable Neutral Density Filter>
<10. Summary and Modifications>

Figure 1:
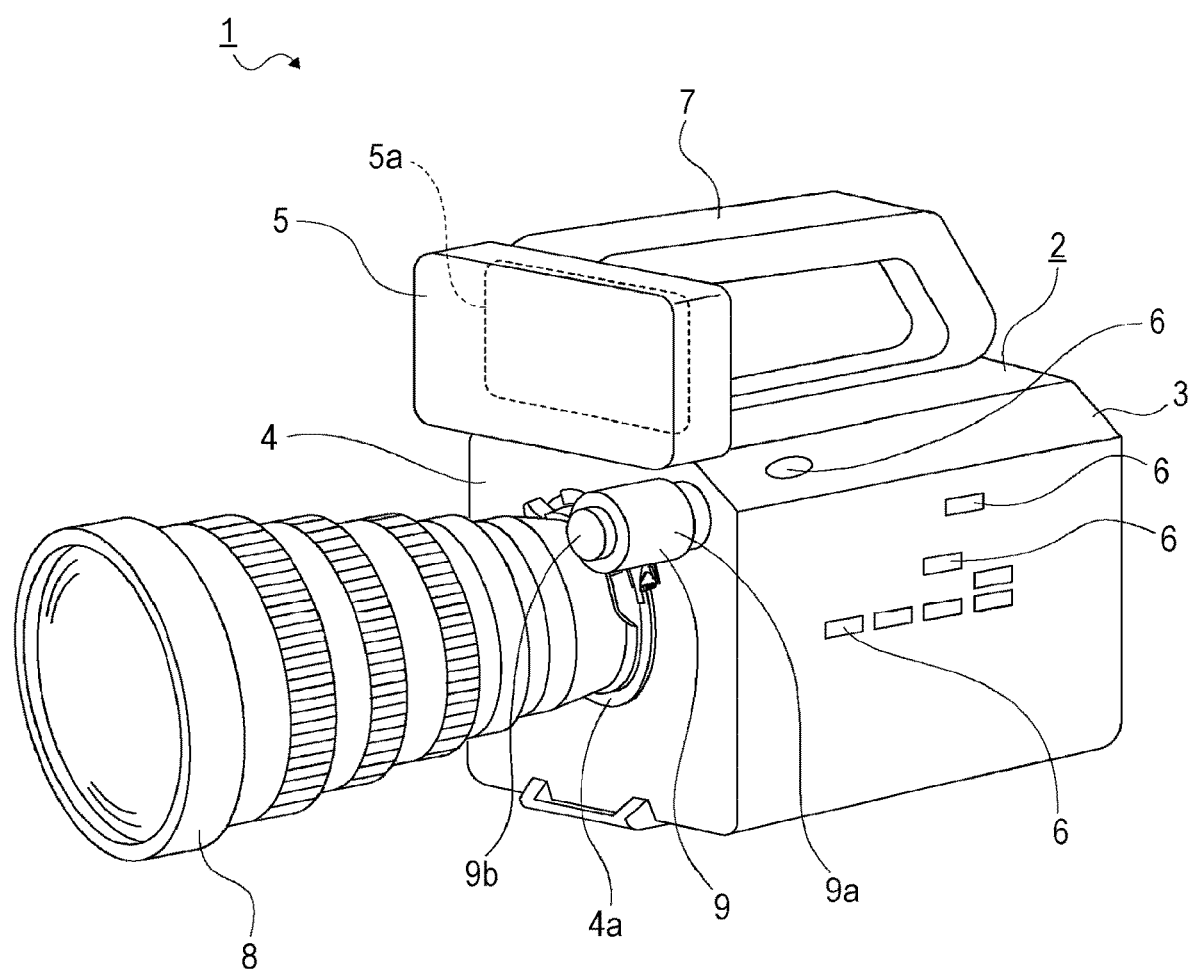
FIG. 1 is a diagram for explaining an example exterior of an imaging apparatus according to an embodiment of the present technology.

<1. Configuration of an Imaging Apparatus According to a First Embodiment>FIG. 1 shows an example exterior of an imaging apparatus 1 according to an embodiment. The imaging apparatus 1 is formed with the respective necessary components disposed inside and outside a housing 2.

The housing 2 includes a box-like main frame unit 3 that is open on its front side, and a panel unit 4 attached to the front end portion of the main frame unit 3. A mount portion 4a is attached to the panel unit 4, and a lens barrel 8 can be detachably attached to the panel unit 4 with the mount portion 4a.

Note that the mount portion 4a may be formed integrally with the panel unit 4 and be provided as a part of the panel unit 4.

Various operating units 6, 6, . . . are disposed on the main frame unit 3. As the operating units 6, 6, . . . , a power button, an imaging button, a zoom knob, a mode switching knob, and the like are provided, for example.

A grip portion 7 is provided on the upper surface side of the main frame unit 3.

A display 5 such as a liquid crystal display (LCD) or an organic electro-luminescence (EL) panel is rotatably supported, for example, on the upper surface of the front end portion of the housing 2. The display 5 has a display surface 5a that faces rearward.

A user (a camera operator) can perform imaging and the like while gripping the grip portion 7 and visually recognizing an image displayed on the display surface 5a of the display 5.

Note that a viewfinder such as an electronic viewfinder or an optical viewfinder may be provided instead of or together with the display 5.

For example, a transmittance operator 9 is provided on the panel unit 4 on the front surface side of the housing 2. The transmittance operator 9 is an operating unit for the user to change the transmittance of a variable neutral density filter that will be described later.

An example of the transmittance operator 9 has a structure that includes a cylindrical rotating member 9a and a pressing portion 9b that is disposed on the front surface side (the top surface of the cylinder) of the rotating member 9a, or on the surface perpendicular to the rotation axis AR.

FIGS. 2A and 2B show operations of the transmittance operator 9. Note that these drawings schematically show the transmittance operator 9 attached to the panel unit 4.

FIG. 2A shows a state (a first state) in which the pressing portion 9b is not pushed in. In this state, the rotating member 9a can be rotated clockwise and counterclockwise about the rotation axis AR.

FIG. 2B shows a state (a second state) in which the pressing portion 9b is pushed in. In this state, the rotating member 9a can also be rotated clockwise and counterclockwise about the rotation axis AR.

For example, when the user presses the pressing portion 9b in the state shown in FIG. 2A, the pressing portion 9b is pushed in as shown in FIG. 2B. Also, when the user presses again the pressing portion 9b in the state shown in FIG. 2B, the state returns to the state in which the pressing portion 9b is not pushed in as shown in FIG. 2A. That is, the pressing portion 9b has a mechanism as a push/push switch that switches between the first state and the second state each time the pressing portion 9b is pressed. Note that the pressing portion 9b may of course be a push/pull switch.

When the pressing portion 9b is in the first state shown in FIG. 2A, for example, a variable mode is then set for a transmittance operation, for example. When the pressing portion 9b is in the second state shown in FIG. 2B, a preset mode is set for a transmittance operation. That is, the pressing portion 9b functions as a mode change switch.

Note that the state shown in FIG. 2B may be set as the first state, and the state shown in FIG. 2A may be set as the second state. In the description below, however, the state shown in FIG. 2A is the first state, and the state shown in FIG. 2B is the second state.

The rotating member 9a is steplessly rotatable. Further, the rotating member 9a has no rotating ends, and can rotate freely both clockwise and counterclockwise. Note that, as a modification, the rotating member 9a may have a rotating end.

When the transmittance operator 9 is in the first state, the transmittance operator 9 serves as an operating unit for setting the operation of the rotating member 9a in the variable mode and continuously changing the transmittance.

When the transmittance operator 9 is in the second state, the transmittance operator 9 serves as an operating unit for setting the operation of the rotating member 9a in the preset mode and selecting preset transmittances (transmittance control values) in a stepwise manner.

Figure 3:
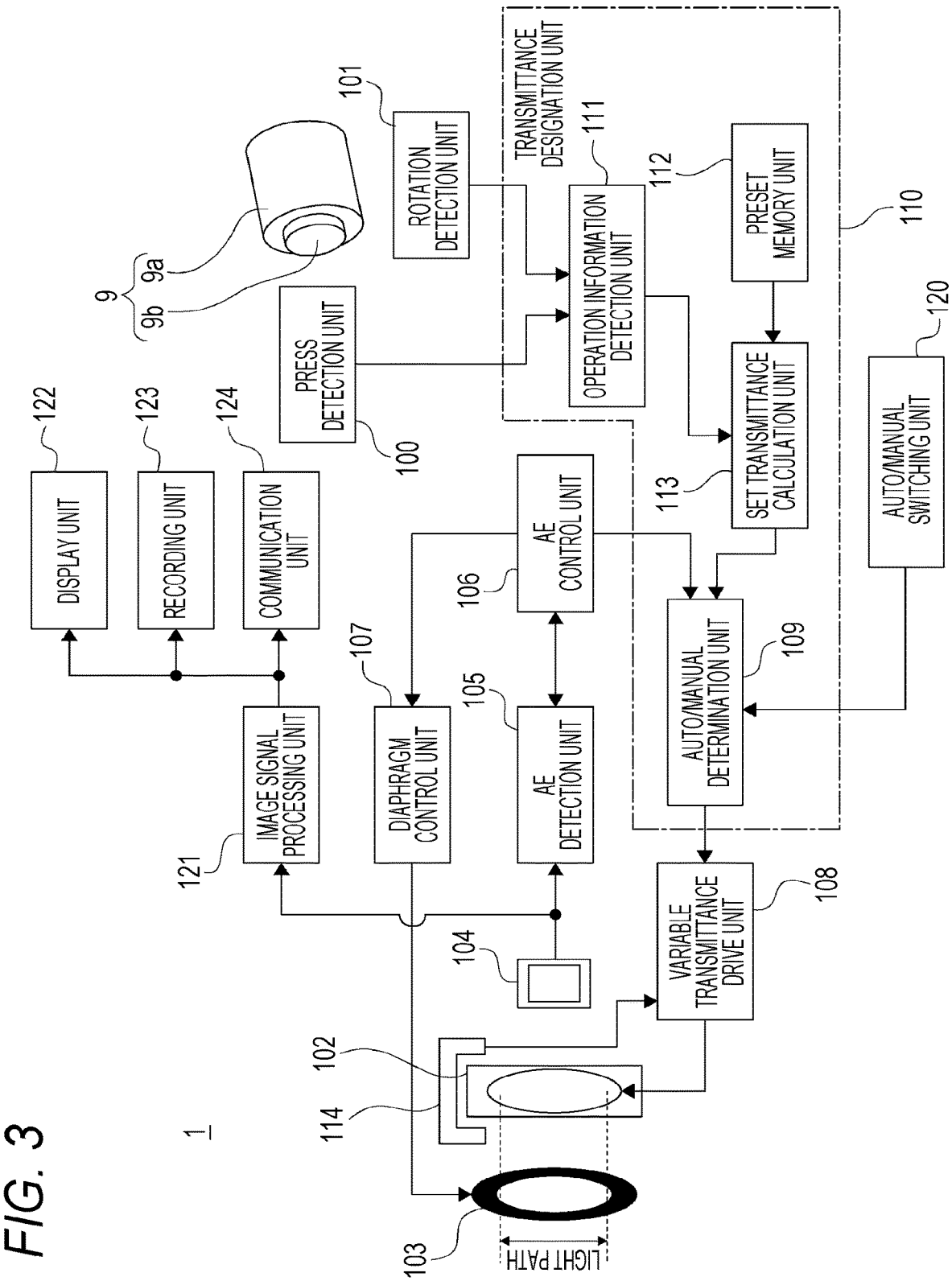
FIG. 3 is a block diagram of an example internal configuration of the imaging apparatus according to an embodiment.

FIG. 3 is a block diagram of the internal configuration of the imaging apparatus 1.

In the imaging apparatus 1, a press detection unit 100 and a rotation detection unit 101 are provided in relation to the transmittance operator 9 described above.

As for the press detection unit 100 and the rotation detection unit 101, there are no restrictions on the internal structures, as long as the press detection unit 100 can detect a pressed state (first state/second state) of the pressing portion 9b, and the rotation detection unit 101 can detect an amount of rotation of the rotating member 9a.

For example, the rotation detection unit 101 detects an amount of rotation of the rotating member 9a with an MR sensor, regardless of whether the mode is the preset mode or the variable mode.

Embodiments are of course not limited to this, and other examples are conceivable. For example, the rotation detection unit 101 may detect an amount of rotation of the rotating member 9a by detecting the amount of change during one cycle using an optical rotary encoder.

Further, in an example, the press detection unit 100 has a mechanism for detecting a pressed state of the pressing portion 9b by detecting the high/low level of the voltage from a voltage level change caused by electrical contact when the pressing portion 9b is pressed, for example.

In the imaging apparatus 1, object light condensed through an optical system (such as a cover lens, a zoom lens, and a focus lens) not shown in the drawing is further limited in light flux in accordance with the aperture size of a diaphragm 103, is reduced while passing through a variable neutral density filter 102, and then forms an image on an imaging device unit 104.

The variable neutral density filter 102 is a device capable of variably controlling filter transmittance by changing the voltage to be applied to the terminal.

For example, when the incident light quantity is set at "1", the variable neutral density filter 102 can reduce the light quantity from "¼" to a desired brightness of "¹/₁₂₈".

Voltage application for variable transmittance driving of the variable neutral density filter 102 is performed by a variable transmittance drive unit 108. The variable transmittance drive unit 108 changes the value of the voltage to be applied to the variable neutral density filter 102 so that the transmittance becomes a transmittance corresponding to a designated transmittance control value.

The current transmittance of the variable neutral density filter 102 is detected by a transmissive sensor 114 formed with a transmissive photointerrupter, for example. The variable transmittance drive unit 108 controls the value of the voltage to be applied to the variable neutral density filter 102, using a feedback system, so that the transmittance converges to the designated transmittance on the basis of an output of the transmissive sensor 114.

The diaphragm 103 is a member in which a plurality of diaphragm blades operates in conjunction with driving of an actuator, and the aperture size can be changed freely. As the diaphragm 103 is formed with a plurality of diaphragm blades, an aperture shape closer to a precise circle can be provided.

The imaging device unit 104 includes an image sensor of a complementary metal oxide semiconductor (CMOS) type or a charge coupled device (CCD) type, for example.

In this imaging device unit 104, a correlated double sampling (CDS) process, an automatic gain control (AGC) process, or the like, for example, is performed on an electric signal obtained by photoelectrically converting light received with the image sensor, and an analog/digital (A/D) conversion process is further performed on the electric signal. An imaging signal as digital data is then output to an image signal processing unit 121 and an automatic exposure (AE) detection unit 105 in the stages that follow.

The image signal processing unit 121 is formed as an image processor, such as a digital signal processor (DSP), for example. This image signal processing unit 121 performs various kinds of signal processing on the digital signal (a captured image signal) from the imaging device unit 104. For example, the image signal processing unit 121 performs preprocessing, a synchronization process, a YC generation process, a resolution conversion process, a codec process, and the like.

A recording unit 123 performs recording/reproduction on a recording medium formed with a nonvolatile memory, for example. The recording unit 123 performs processing of recording image files such as moving image data and still image data, thumbnail images, and the like on a recording medium, for example.

The recording unit 123 can take various forms. For example, the recording unit 123 may be formed as a write/read circuit for a flash memory included in the imaging apparatus 1, or may be in the form of a card recording/reproducing unit that makes recording/reproducing access to a recording medium that can be detachably attached to the imaging apparatus 1, such as a memory card (a portable flash memory or the like), for example. Alternatively, as a component to be included in the imaging apparatus 1, the recording unit 123 may be formed as a hard disk drive (HDD) or the like.

The display unit 122 is a display unit that performs various kinds of displays for the user such as a camera operator, and may be a display 5 or a viewfinder disposed in the housing of the imaging apparatus 1, for example.

The display unit 122 performs various kinds of displays on its display screen. For example, the display unit 122 displays a reproduced image of image data read from a recording medium in the recording unit 123.

Also, there are cases where image data of a captured image whose resolution has been converted for display by the image signal processing unit 121 is supplied to the display unit 122 to perform display. As a result, a so-called through-the-lens image (an object monitoring image) that is a captured image during picture composition confirmation is displayed.

The display unit 122 also displays various operation menus, icons, messages, and the like, which are displays as graphical user interfaces (GUI) on the screen.

A communication unit 124 performs data communication, network communication, or the like with an external device in a wired or wireless manner. For example, captured image data (a moving image or a still image) processed by the image signal processing unit 121 is transmitted/output to an external information processing device, display device, recording device, reproduction device, or the like.

Operations of the image processing unit 121, the display unit 122, the recording unit 123, and the communication unit 124 described above are controlled by a microcomputer (an arithmetic processing device) (not shown) that performs overall control in the imaging apparatus, for example.

The microcomputer includes a central processing unit (CPU), a read only memory (ROM), a random access memory (RAM), a non-volatile memory, an interface unit, and the like, and executes a program stored in the ROM, the flash memory, or the like, in accordance with a user operation through an operating unit 6 or the like, or various kinds of sensor information, for example. By doing so, the microcomputer performs various kinds of control for necessary camera operations.

For example, the microcomputer controls necessary operations of the respective components, such as the shutter speed of the imaging device unit 104, instructions as to various kinds of signal processing in the image signal processing unit 121, imaging operations and recording operations according to user operations, operations of the lens system such as zooming, focusing, and diaphragm adjustment in the lens barrel 8, and user interface operations.

Further, it is conceivable that the AE detection unit 105, an automatic exposure (AE) control unit 106, a diaphragm control unit 107, a variable transmittance drive unit 108, and a transmittance designation unit 110 that will be described later are designed as control/arithmetic functions of the microcomputer described above.

Note that each of these units is designed as a control/arithmetic function of the microcomputer in an example, and each of these units may be formed with an individual processor, a logic circuit, or the like.

Light quantity information about the object image formed on the imaging device 104 is also input to the AE detection unit 105. The AE detection unit 105 performs numerical conversion on the input light quantity.

The user can set the area of photometry, the presence/absence of an emphasized area, and the like as desired, and the AE detection unit 105 performs a detection process in accordance with the user settings.

The AE control unit 106 performs automatic exposure control on the basis of information about the difference between a result of detection performed by the AE detection unit 105 and appropriate exposure that is set by the user.

Specifically, if the difference is 0, the AE control unit 106 maintains the current state because the exposure control is appropriate for the current object. If there is a difference, the AE control unit 106 performs control to change the exposure control block to approach the appropriate exposure.

In this embodiment, the two devices corresponding to the exposure control block are the variable neutral density filter 102 and the diaphragm 103.

The AE control unit 106 decomposes the calculated control value into a diaphragm control value and a transmittance control value, outputs the diaphragm control value to the diaphragm control unit 107, and outputs the transmittance control value to the variable transmittance drive unit 108 (strictly speaking, the transmittance control value is output to the variable transmittance drive unit 108 via an auto/manual determination unit 109 in this example configuration).

Note that the shutter speed that controls the exposure time, and a gain circuit that internally performs signal amplification may be included in the exposure control block, and the AE control unit 106 may control the exposure control block.

The diaphragm control unit 107 converts the diaphragm control value received from the AE control unit 106 into the corresponding aperture size of the diaphragm 103, determines the amount of driving of the actuator so that the diaphragm blade has the designated aperture size, and outputs a drive signal to the actuator.

The variable transmittance drive unit 108 applies a voltage corresponding to the received transmittance control value, to the variable neutral density filter 102. For example, the transmittance control value received from the AE control unit 106 via the auto/manual determination unit 109 is converted into the corresponding transmittance of the variable neutral density filter 102, the voltage to be applied is determined so that the transmittance becomes the transmittance designated by the transmittance control value, and the predetermined voltage is applied to the terminal of the variable neutral density filter 102.

As will be described later, in some cases, the variable transmittance drive unit 108 may determine the voltage to be applied in accordance with the transmittance control value received from a set transmittance calculation unit 113 via the auto/manual determination unit 109, and apply the voltage to the terminal of the variable neutral density filter 102.

As described above, the variable transmittance drive unit 108 also forms a feedback circuit system that feeds back the output of the transmissive sensor 114 as feedback information, and finely adjusts the voltage to be applied so that the transmittance converges to the designated transmittance.

Note that the transmittance control value received by the variable transmittance drive unit 108 is only required to be a value designating a specific transmittance, or may be the transmittance, or may be a control value for achieving a target transmittance, instead of the transmittance.

The transmittance designation unit 110 includes the auto/manual determination unit 109, an operation information detection unit 111, a preset memory unit 112, and the set transmittance calculation unit 113, for example.

The auto/manual determination unit 109 determines whether the mode is an auto mode in which the transmittance of the variable neutral density filter 102 is controlled on the basis of the transmittance control value calculated from the AE control unit 106, or whether the mode is a manual mode in which the transmittance of the variable neutral density filter 102 is controlled on the basis of a user operation using the transmittance operator 9.

The inputs to the auto/manual determination unit 109 are the transmittance control value from the AE control unit 106 and the transmittance control value from the set transmittance calculation unit 113.

In the case of the auto mode, the auto/manual determination unit 109 supplies the transmittance control value from the AE control unit 106 to the variable transmittance drive unit 108.

In the case of the manual mode, the auto/manual determination unit 109 supplies the transmittance control value from the set transmittance calculation unit 113 to the variable transmittance drive unit 108.

The auto mode/manual mode is set by an auto/manual switching unit 120. The auto/manual switching unit 120 is a means that switches between automatic control for controlling the transmittance of the variable neutral density filter 102 on the basis of the AE control unit 106, and manual control for controlling the transmittance of the variable neutral density filter 102 on the basis of the transmittance operator 9.

The auto/manual switching unit 120 may be a switching means formed with a key member as an operating unit 6, for example, or may be a switching means on a user interface formed with display on the display 5.

Alternatively, the auto/manual switching unit 120 may have a control specification that includes a button-type operating member, for example, be operated in the manual mode by default, and be operated in the auto mode only while the button is being pressed.

The output value of the auto/manual switching unit 120 is input to the auto/manual determination unit 109, and the auto/manual determination unit 109 determines whether the operation is an automatic operation or a manual operation, on the basis of the output value.

The operation information detection unit 111 detects output signals of the press detection unit 100 and the rotation detection unit 101.

The operation information detection unit 111 detects a detection signal of a pressed state (first state/second state) from the press detection unit 100, and outputs a binary signal that is at the low level in the first state (non-pressed state), and is at the high level in the second state (pressed state), for example.

The operation information detection unit 111 outputs this high/low binary signal as an output signal of the pressing portion 9b to the set transmittance calculation unit 113.

The operation information detection unit 111 also outputs one sensor signal as an output signal of the rotating member 9a, regardless of the pressed state of the pressing portion 9b. The operation information detection unit 111 detects the relative rotation amount (with the rotational direction being expressed by a positive/negative mark) from the rotation position at the previous polling time through polling control, and outputs the relative rotation amount to the set transmittance calculation unit 113.

The preset memory unit 112 is a memory unit that stores transmittance control values that are set at times of the preset mode. The transmittance control values to be stored are control values to be directed to the variable transmittance drive unit 108, and may be the values of transmittances or control values corresponding to the transmittances.

As the preset mode, preset numbers such as "1", "2", "3", . . . , and "8" are assigned, for example, and transmittance control values are assigned to the respective preset numbers.

The user can freely change the stored transmittance control values associated with the preset numbers in the preset memory unit 112 from a user interface for settings. When a change is made, the changed transmittance control values are sequentially stored into the corresponding memory in the preset memory unit 112.

Note that, in a modification, the stored transmittance control values associated with the preset numbers in the preset memory unit 112 may be made unrewritable.

The set transmittance calculation unit 113 calculates the transmittance set by an operation from the user on the basis of the information from the operation information detection unit 111.

The set transmittance calculation unit 113 first determines the modes of the variable mode and the preset mode, from the output value of the press detection unit 100.

In the case of the variable mode, the set transmittance calculation unit 113 obtains a transmittance amount change from the amount of relative rotation of the rotating member 9a obtained from the operation information detection unit 111, and adds the obtained transmittance change amount to the current transmittance of the variable neutral density filter 102. That is, the "current transmittance+transmittance change amount" is set as the transmittance to be designated, and the transmittance control value corresponding to the transmittance to be designated is output.

Note that, in a case where the "current transmittance+ transmittance change amount" exceeds a settable transmittance range (the range of "¼" to "1/128", for example), the resultant transmittance is limited within the settable transmittance range.

The set transmittance calculation unit 113 outputs the transmittance control value thus obtained as a designation value in the manual mode to the auto/manual determination unit 109.

In the case of the preset mode, the set transmittance calculation unit 113 converts the amount of relative rotation of the rotating member 9a obtained from the operation information detection unit 111 into a preset switch number, and adds the preset switch number to the current preset number. That is, the "current preset number+preset switch number" is set as a new preset number.

Note that, in a case where the "current preset number+ preset switch number" exceeds a settable preset number range ("1" to "8", for example), the resultant preset number is limited within the preset number range.

The set transmittance calculation unit 113 acquires, from the preset memory unit 112, the transmittance control value corresponding to the preset number determined as above, and outputs the transmittance control value as a designation value in the manual mode to the auto/manual determination unit 109.

<2. Comparative Examples>

A comparative example is now described, prior to explanation of specific operations according to the embodiment with the configuration described above.

In a case where the variable mode and the preset mode are prepared for transmittance control, a stepless dial for operations in the variable mode and a position switch for the preset mode are normally provided as the operation system.

Figure 4:
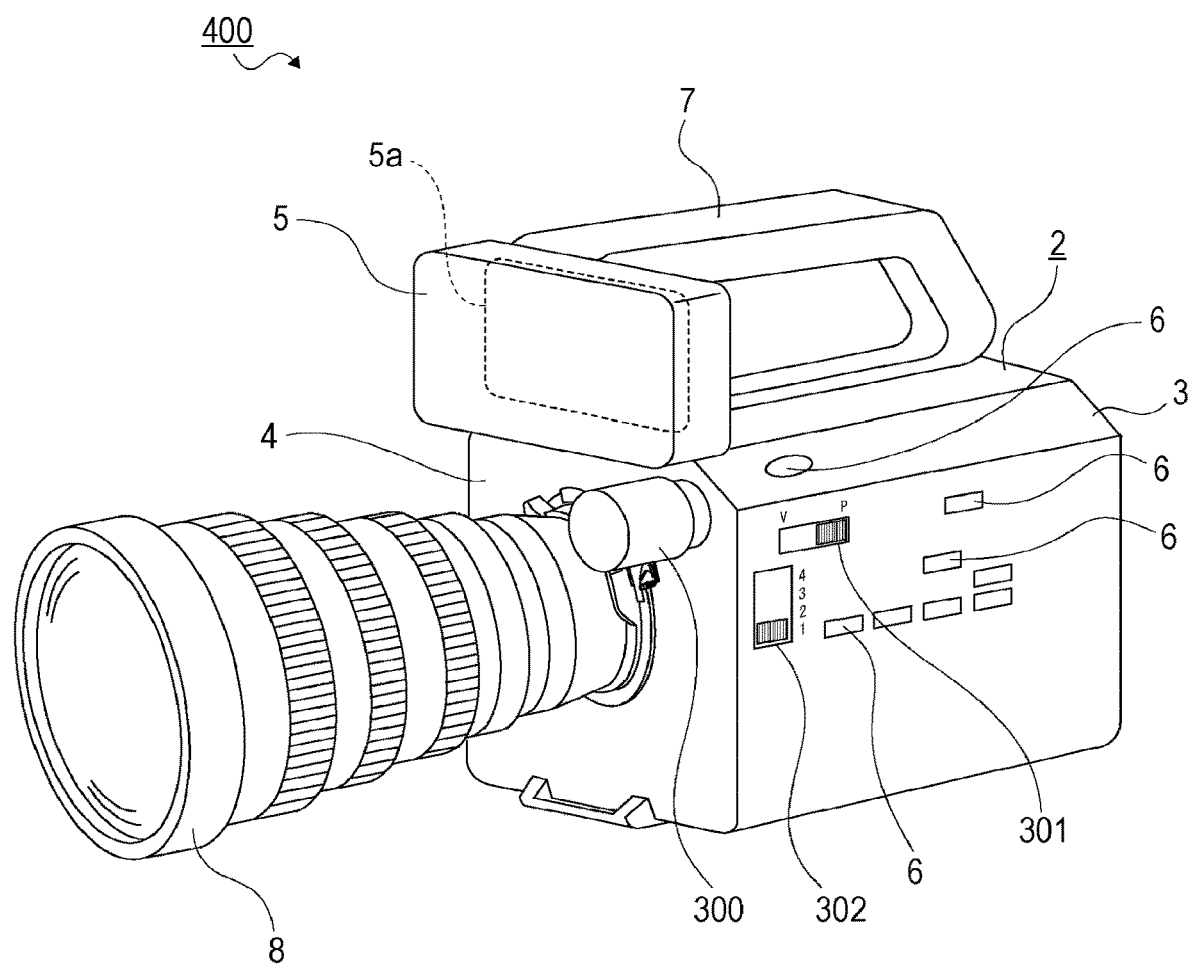
FIG. 4 is a diagram for explaining the operation system of an imaging apparatus as a comparative example.

FIG. 4 shows an imaging apparatus 400 including such an operation system. Note that the same components as those in FIG. 1 are denoted by the same reference numerals as those used in FIG. 1.

In the imaging apparatus 400, a dial for operations in the variable mode is provided as a rotating operation unit 300. Further, an operating unit having a slide switch structure is provided as a preset operating unit 302, for example, so that the user can select among the preset numbers "1" to "4".

In addition to the above, a mode operating unit 301 having a slide switch structure is provided, for example, so that the user can select between the variable mode and the preset mode.

Where the variable mode and the preset mode are prepared in this manner, operating members are provided for the respective modes, and an operating member for switching modes is separately provided, which complicates the operation system. Further, the degree of difficulty of a switching operation during imaging becomes higher. At a time of actual imaging, the camera operator is gazing at the display 5 or a viewfinder, and searches for operating units in a blind manner. Therefore, the operability of mode switching and preset selection is degraded, and the possibility of an erroneous operation becomes higher.

Therefore, in this embodiment, the rotating member 9a and the pressing portion 9b are provided as the transmittance operator 9, to dramatically increase the operability in the variable mode and the preset mode.

In the description below, a specific example process designed for this purpose is described.

<3. Example Process According to the First Embodiment>

Figure 5:
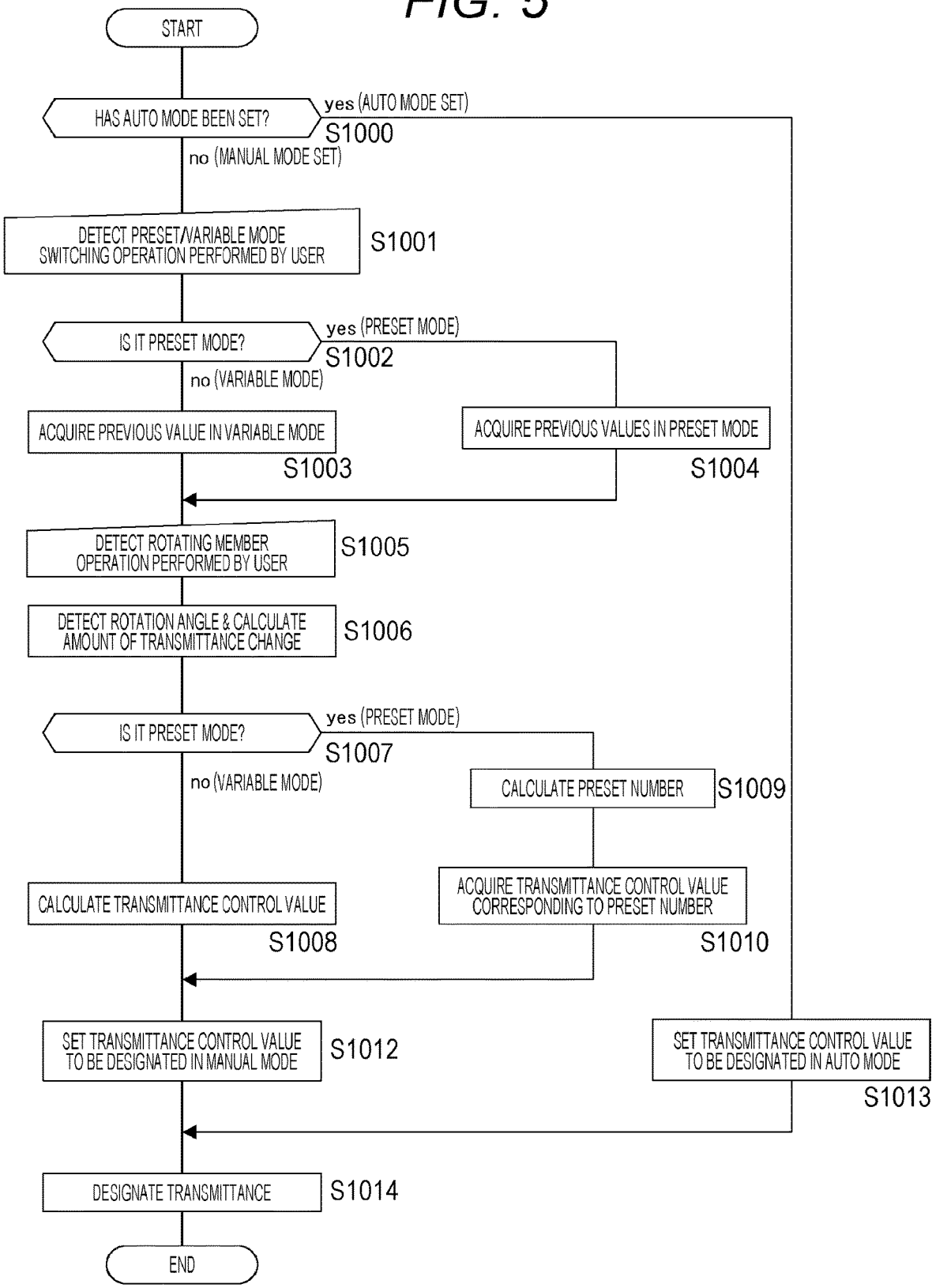
FIG. 5 is a flowchart of a transmittance setting process according to the first embodiment.

FIG. 5 shows an example process corresponding to a transmittance operation according to this embodiment. FIG. 5 shows an example process to be performed by the transmittance designation unit 110 (the operation information detection unit 111, the set transmittance calculation unit 113, the preset memory unit 112, and the auto/manual determination unit 109) shown in FIG. 3.

The transmittance designation unit 110 repeats the process shown in FIG. 5 in cycles of 100 msec, for example, and monitors changes in the operation system.

In step S1000, the transmittance designation unit 110 checks the auto/manual setting. That is, the operating state of the auto/manual switching unit 120 is determined.

If the auto mode is designated by the user, the transmittance designation unit 110 moves on to step S1013, and sets the transmittance control value calculated by the AE control unit 106 on the basis of AE detection as the transmittance control value directed to the variable transmittance drive unit 108. In step S1014, the transmittance designation unit 110 issues a transmittance designation to the variable transmittance drive unit 108.

As a result, in the auto mode, the transmittance of the variable neutral density filter 102 is controlled on the basis of the transmittance control value automatically generated by the AE control unit 106.

If the mode is determined to be the manual mode in step S1000, the process being performed by the transmittance designation unit 110 moves on to step S1001.

In step S1001, the transmittance designation unit 110 detects a mode switching operation for the preset mode or the variable mode from the user. That is, an operation of the pressing portion 9b is detected.

An operation from the user may be received at any point in the sequence. In the internal processing, however, an output signal of the press detection unit 100 that detects the pressed state of the pressing portion 9b is checked only in this step.

After acquiring the pressed state (first state/second state) of the pressing portion 9b in step S1001, the transmittance designation unit 110 moves on to step S1002.

In step S1002, the transmittance designation unit 110 determines whether the operation mode of the variable neutral density filter 102 is the preset mode or is the variable mode. Specifically, mode determination is performed on the basis of the pressed state of the pressing portion 9b acquired in step S1001. The process moves on to step S1004 in the case of the preset mode, and moves on to step S1003 in the case of the variable mode.

In step S1003, the transmittance designation unit 110 acquires the previous value in the variable mode. Here, the previous value is the transmittance control value for the variable neutral density filter 102 in the most recent variable mode.

For example, if the mode is also the variable mode at the time of the previous polling (about 100 msec earlier), the transmittance control value corresponding to the current transmittance of the variable neutral density filter 102 is acquired.

In the variable mode, the transmittance is changed in a relative manner at polling cycle intervals, the previous value is used as the reference position.

After the previous value is acquired in step S1003, the process being performed by the transmittance designation unit 110 moves on to step S1005.

If the process moves on to step S1004 in the preset mode, on the other hand, the transmittance designation unit 110 acquires the previous values in the preset mode. Here, the previous values are the transmittance control value for the variable neutral density filter 102 and the preset number in the most recent preset mode (about 100 msec earlier, which is the previous polling time, for example). After the completion of this step, the process being performed by the transmittance designation unit 110 moves on to step S1005.

In step S1005, the transmittance designation unit 110 detects an operation of the rotating member 9a by the user. As in step S1001, a user operation may be performed at any timing. However, in the internal processing, the cumulative rotation amount since step S1005 in the previous polling till the present is acquired in step S1005.

In step S1006, the transmittance designation unit 110 acquires the operation of the rotating member 9a as rotation angle information, and converts the rotation angle information into a transmittance change amount.

A rotation angle is stored in a range of ±360 deg, and the conversion coefficient to be used in conversion from a rotation angle to a transmittance varies depending on the preset/variable mode. An MR sensor can detect the absolute position of a rotation angle within 360 deg. Since a polling cycle is specified as 100 msec, a case where the rotation angle exceeds 360 deg does not occur in practice, and is excluded from the preconditions. As for the conversion coefficient, the amount of change is "1" at 45 deg in the case of the preset mode, and the amount of change is "1" (a change in transmittance by ⅙ EV, for example) at 10 deg in the case of the variable mode.

In step S1007, the transmittance designation unit 110 branches the process depending on the mode as in step S1002. Specifically, the process moves on to step S1009 in the case of the preset mode, and moves on to step S1008 in the case of the variable mode.

In step S1008, the transmittance designation unit 110 calculates the transmittance control value to be designated in the variable mode, using the set transmittance calculation unit 113.

In this case, the previous value as the reference value acquired in step S1003 is added to the transmittance change amount calculated in step S1006, and a limiting process is performed so that the result falls within the settable range (from "¼" to "¹⁄₁₂₈"). After completion of this step, the process moves on to step S1012.

Note that, in step S1008, the calculated new transmittance control value is stored, because the calculated new transmittance control value is to be used as the previous value in step S1003 in the process to be performed next time.

In a case where the transmittance designation unit 110 moves on to step S1009, the transmittance designation unit 110 calculates the preset number in the preset mode, using the set transmittance calculation unit 113.

For example, the preset number that is a previous value serving as a reference value acquired in step S1004 is added to the transmittance change amount calculated in step S1006 (the conversion coefficient is designed so that the preset number matches the unit system). Further, a limiting process is performed so that the result falls within the settable range (from "1" to "8") that is the range of preset numbers. In this manner, a new preset number is calculated. The process then moves on to step S1010.

Note that, in step S1009, the calculated new preset number is stored, because the calculated new preset number is to be used as a previous value in step S1004 in the process to be performed next time.

In step S1010, the transmittance designation unit 110 acquires the transmittance control value corresponding to the preset number calculated in step S1009. Specifically, the transmittance designation unit 110 accesses the preset memory unit 112 using the preset number as a key, and acquires the corresponding transmittance as the designated transmittance.

After completion of this step, the process moves on to step S1012.

In step S1012, the transmittance designation unit 110 sets the transmittance control value to be directed to the variable transmittance drive unit 108 in the manual mode.

Specifically, in a case where the process moves from step S1008 on to step S1012, the transmittance designation unit 110 sets the transmittance control value calculated in step S1008 as the transmittance control value to be directed to the variable transmittance drive unit 108.

In a case where the process moves from step S1010 on to step S1012, on the other hand, the transmittance designation unit 110 sets the transmittance control value acquired from the preset memory unit 112 in step S1010 as the transmittance control value to be directed to the variable transmittance drive unit 108.

In step S1014, the transmittance designation unit 110 then supplies the transmittance control value to the variable transmittance drive unit 108, to designate the transmittance.

As a result, in the manual mode, the transmittance control value in the variable mode or the preset mode is set in accordance with an operation of the transmittance operator 9, and thus, the transmittance of the variable neutral density filter 102 is controlled.

The process described above is a transmittance control process according to the first embodiment.

For example, in a case where the rotating member 9a has not been operated since the previous polling control, the rotation angle in step S1006 is 0 deg, and the transmittance of the variable neutral density filter 102 is maintained at the previous value.

Also, in a case where the pressing portion 9b is switched, on the other hand, it is conceivable to set the specific transmittance in the mode to which the mode is switched, or the transmittance in the mode to which the mode was switched in the past, instead of maintaining the most recent transmittance.

Further, when the operation mode is switched from the preset mode to the variable mode by an operation of the pressing portion 9b, the transmittance at the last point of time in the preset mode is only required to be maintained. The user is then enabled to finely adjust the transmittance, using the transmittance in the preset mode as the starting point.

<4. Second Embodiment>

Figure 6:
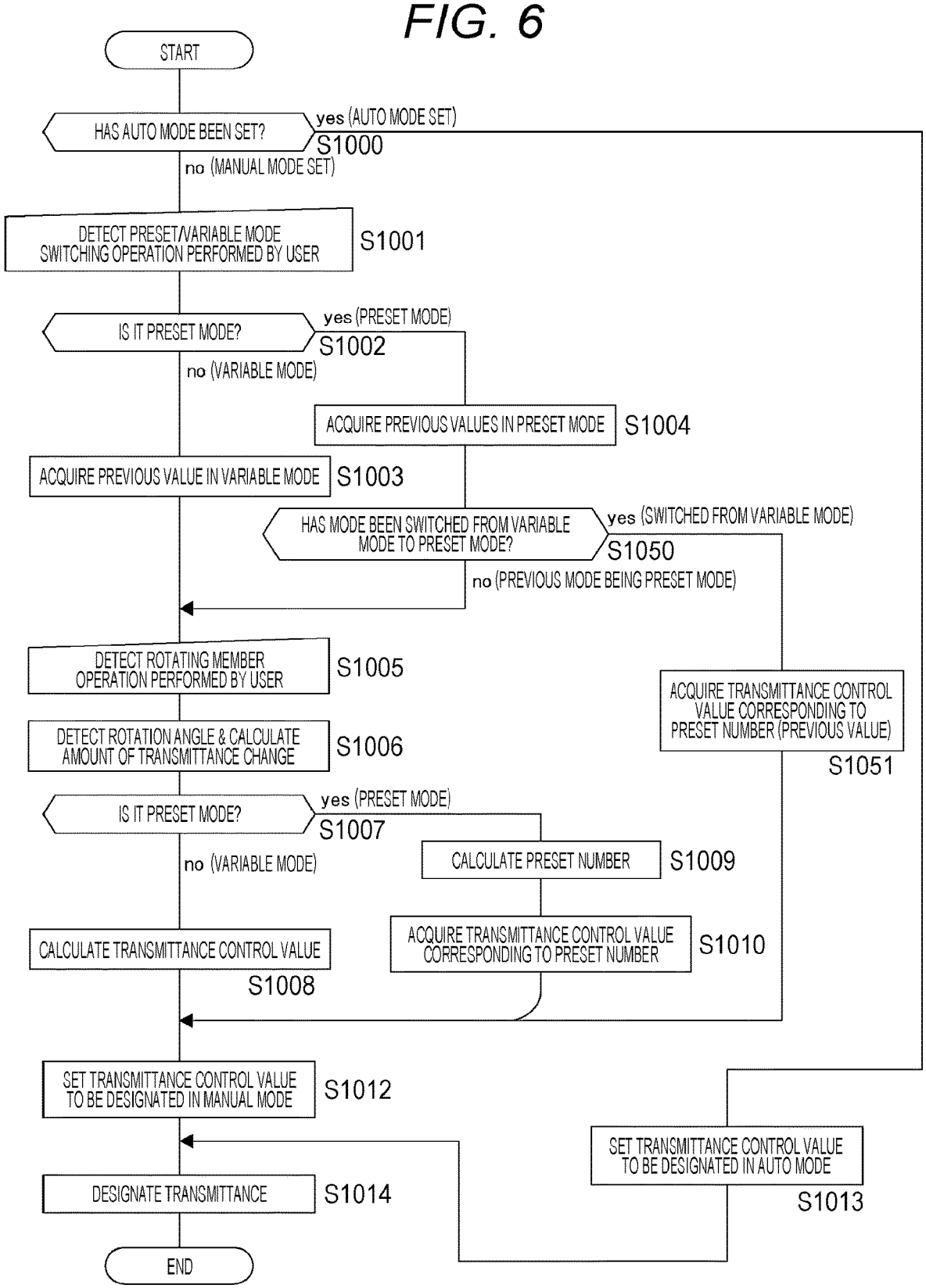
FIG. 6 is a flowchart of a transmittance setting process according to a second embodiment.

An example process to be performed by the transmittance designation unit 110 is now described as a second embodiment, with reference to FIG. 6.

Note that, in the following description of a flowchart, the same steps as those in the above example process are denoted by the same step numbers as those used in the above example process, and explanation of them is not repeated herein.

In the example process shown in FIG. 6, when the transmittance operator 9 is switched from the first state to the second state, or when the operation mode is switched from the variable mode to the preset mode, the transmittance designation unit 110 supplies the variable transmittance drive unit 108 with the transmittance control value stored and associated with the preset number selected at last in the previous second state (preset mode).

FIG. 6 differs from FIG. 5 in that steps S1050 and S1051 are added.

After moving from step S1002 on to step S1004, the transmittance designation unit 110 in step S1050 determines whether or not this is the timing at which the operation mode is switched from the variable mode to the preset mode.

If the operation mode was also the preset mode at the previous time (at the time of processing 100 msec earlier, for example), the transmittance designation unit 110 moves on to step S1005, and performs a process similar to that shown in FIG. 5.

If the operation mode was the variable mode at the previous time, and this is the timing at which the operation mode is switched to the preset mode, the transmittance designation unit 110 moves from step S1050 on to step S1051, to acquire the previous preset number, which is the preset number selected at last when the preset mode was set in the past, and acquire the transmittance control value corresponding to the preset number from the preset memory unit 112.

The transmittance designation unit 110 then moves on to step S1012. In this case, the transmittance designation unit 110 sets the transmittance control value acquired from the preset memory unit 112 in step S1051 as the transmittance control value to be directed to the variable transmittance drive unit 108.

In step S1014, the transmittance designation unit 110 then supplies the transmittance control value to the variable transmittance drive unit 108, to designate the transmittance.

Accordingly, in the case of the second embodiment, when the operation mode is switched from the variable mode to the preset mode, the transmittance of variable neutral density filter 102 is controlled to be the transmittance depending on the last preset number of the previous preset mode.

Note that, because the calculated preset number is used as a previous value in step S1004 in the process to be performed next time, the calculated new preset number is stored in step S1009. However, the preset number is also retained during the variable mode period. As the most recently selected preset number is stored as the so-called last memory, the stored preset number can be used in step S1051.

In this example process, the last preset number of the previous preset mode is stored. Therefore, in a case where the transmittance control value corresponding to the preset number is rewritten by a user operation or the like before the operation mode is switched to the current preset mode, even if the last preset number of the previous preset mode is used, a transmittance control value different from the previous transmittance control value might be read and used for control.

In view of this, it is also conceivable to store not the preset number but the transmittance control value read at last in the previous preset mode, and read the transmittance control value in step S1051.

For example, in step S1010, the transmittance control value read from the preset memory unit 112 may be separately stored as the previous transmittance control value.

Note that, in that case, the initial transmittance at the time of switching to the preset mode might be a value not stored in the current preset memory unit 112 (a state in which the corresponding preset number does not exist). This is a case where the transmittance control values corresponding to the respective preset numbers have been rewritten in the preset memory unit 112.

In such a case, after the transmittance in step S1051 is first set, the current preset number may be assumed to be the preset number corresponding to the transmittance closest to the transmittance, and be made compatible with the preset number changing operation (an operation of the rotating member 9*a*) to be performed after that.

Note that, when the operation mode is switched from the preset mode to the variable mode, on the other hand, the transmittance at the last point of time in the preset mode may be maintained, or the transmittance may be the last transmittance of the previous variable mode.

<5. Third Embodiment>

Figure 7:
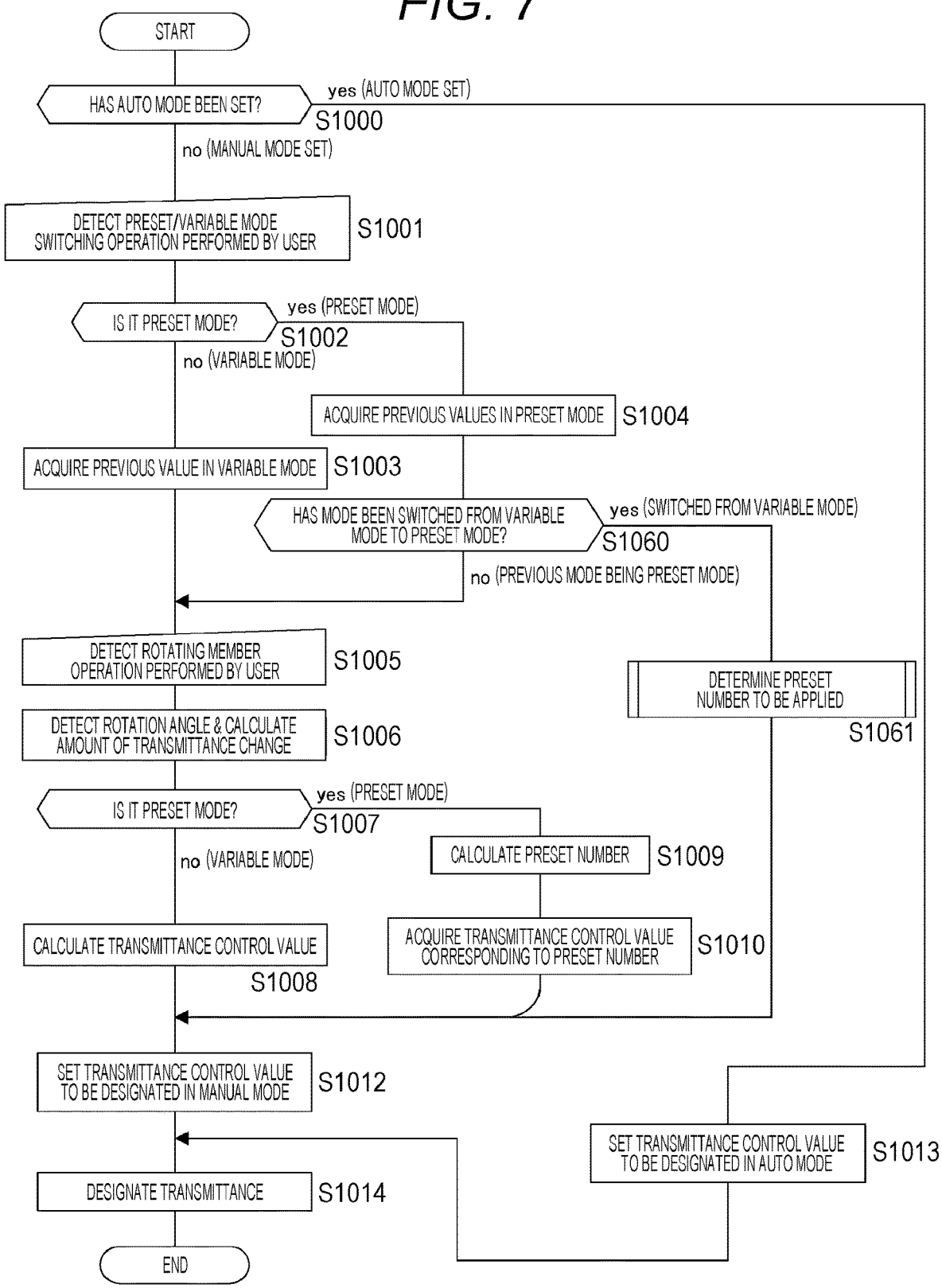
FIG. 7 is a flowchart of a transmittance setting process according to a third embodiment.
Figure 8:
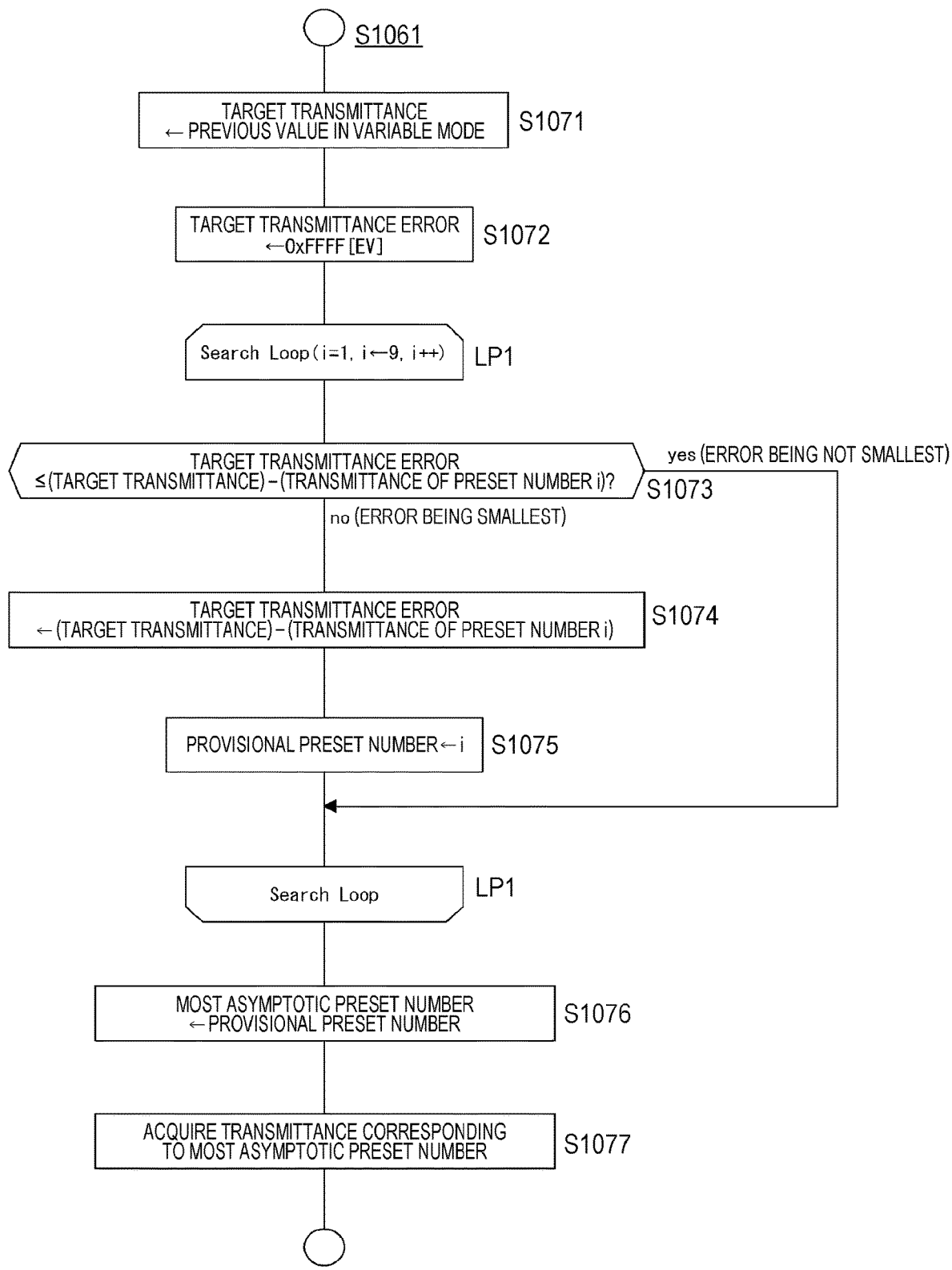
FIG. 8 is a flowchart of determination of the preset number to be applied according to the third embodiment.

An example process to be performed by the transmittance designation unit 110 is now described as a third embodiment, with reference to FIGS. 7 and 8.

In the example process shown in FIG. 7, when the transmittance operator 9 is changed from the first state to the second state, or when the operation mode is switched from the variable mode to the preset mode, the transmittance designation unit 110 sets the transmittance of the variable neutral density filter 102 to the value closest to the transmittance in the most recent variable mode.

FIG. 7 differs from FIG. 5 in that steps S1060 and S1061 are added.

After moving from step S1002 on to step S1004, the transmittance designation unit 110 in step S1060 determines whether or not this is the timing at which the operation mode is switched from the variable mode to the preset mode.

If the operation mode was also the preset mode at the previous time (at the time of processing 100 msec earlier, for example), the transmittance designation unit 110 moves on to step S1005, and performs a process similar to that shown in FIG. 5.

If the previous mode is the variable mode, and this is the timing to switch to the preset mode, the transmittance designation unit 110 moves from step S1060 on to step S1061, and performs a process of determining the preset number to be applied so that the transmittance becomes close to the transmittance in the most recent variable mode.

This process in step S1061 is shown in FIG. 8.

Note that, for ease of explanation, the transmittance control value is equal to the transmittance in this case.

In step S1071, the transmittance designation unit 110 sets the value (previous value) of the move recent variable mode as the target transmittance at the start of the preset mode. That is, this previous value is only required to be the transmittance control value (=transmittance) calculated and stored in step S1008. In other words, if the variable mode is continued, this is the previous value acquired in step S1003.

In step S1072, the transmittance designation unit 110 sets a target transmittance error. For example, the target transmittance error is set as an exposure value (EV). For example, the maximum value of the error is set as "0xFFFF".

Steps S1073, S1074, and S1075 are then repeated as a loop process LP1 a required number of times.

In this case, a variable i indicating a preset number is 1 (i=1) in the initial state, and the variable i is incremented within a range of i≤9.

In step S1073, a check is made to determine whether or not the value of [(target transmittance)−(transmittance of preset number i)] is equal to or greater than the target transmittance error.

Note that the value of [(target transmittance)−(transmittance of preset number i)] mentioned herein is its absolute value.

If the value of [(target transmittance)−(transmittance of preset number i)] is equal to or greater than the target transmittance error, one loop process is ended, the variable i is incremented, and the process returns to step S1073.

If the value of [(target transmittance)−(transmittance of preset number i)] is neither equal to nor greater than the target transmittance error, the transmittance designation unit 110 sets the value of [(target transmittance)−(transmittance of preset number i)] as the target transmittance error in step S1074. That is, the target transmittance error is updated.

In step S1075, the current preset number i is then stored as a provisional preset number. That is, the current preset number i is stored as the preset number whose value of [(target transmittance)−(transmittance of preset number i)] is currently the smallest.

As this process is repeated from the preset number "1" to the preset number "8", the preset number whose value of [(target transmittance)−(transmittance of preset number i)] is the smallest remains as the provisional preset number. That is, this preset number is of the transmittance closest to the transmittance of the previous variable mode.

Therefore, in step S1076, the transmittance designation unit 110 sets the value of the provisional preset number as the most asymptotic preset number.

In step S1077, the transmittance designation unit 110 then acquires the transmittance control value corresponding to the most asymptotic preset number from the preset memory unit 112.

After completing the above process, the transmittance designation unit 110 moves on to step S1012 in FIG. 7. In this case, the transmittance designation unit 110 sets the transmittance control value acquired from the preset memory unit 112 in step S1077 in the process of determining the to-be-applied preset number in step S1061, as the transmittance control value to be directed to the variable transmittance drive unit 108.

In step S1014, the transmittance designation unit 110 then supplies the transmittance control value to the variable transmittance drive unit 108, to designate the transmittance.

Thus, in the case of the third embodiment, when the operation mode is switched from the variable mode to the preset mode, the transmittance of the variable neutral density filter 102 does not greatly fluctuate. This is because the preset number is selected so that the transmittance becomes close to the transmittance designated in the most recent variable mode.

Accordingly, this embodiment is useful in a case where the mode is simply changed from the variable mode to the preset mode, and no drastic change in exposure is expected.

Note that, when the operation mode is switched from the preset mode to the variable mode, on the other hand, the transmittance at the last point of time in the preset mode is only required to be maintained. That is, the user is enabled to finely adjust the transmittance, using the transmittance in the preset mode as the starting point. However, when the operation mode is switched from the preset mode to the variable mode, the last transmittance in the previous variable mode may be used.

<6. Fourth Embodiment>

As a fourth embodiment, another example form of the transmittance operator 9, and an example process different from those of the first, second, and third embodiments are now described.

In FIG. 9, an example of the transmittance operator 9 is schematically shown, as in FIG. 2.

In the case of the example shown in FIG. 9, the transmittance operator 9 does not include the pressing portion 9b like the one in FIG. 2, and switches modes and designates a transmittance only with the rotating member 9a.

The rotating member 9a has no rotating ends, and can rotate in both directions.

The position of the rotation axis of the rotating member 9a changes, as indicated as a rotation axis AR1 in FIG. 9A and a rotation axis AR2 in FIG. 9B. That is, the rotating member 9a is a mechanism that slides so that the rotation axis position changes.

For example, FIG. 9A shows the slide position in a first state, and the apparatus functions in the variable mode when the rotating member 9a is at this position. FIG. 9B shows the slide position in a second state, and the apparatus functions in the preset mode when the rotating member 9a is at this position.

The rotating member 9a has an electrode provided therein. At the slide position in the first state, the electrode is in contact with an electrode on the main frame side, to be short-circuited as an electrical circuit. Accordingly, the low level is detected At the slide position in the second state, the electrodes are separated from each other, to be in an open state. As a result, the high level is detected and is output as a sensor output, and the position of the rotating member 9a is detected. Of course, the inverse theory may be adopted.

The rotating member 9a is a mechanism that is rotatable and steplessly adjustable at either slide position in the first state or the second state.

Figure 10:
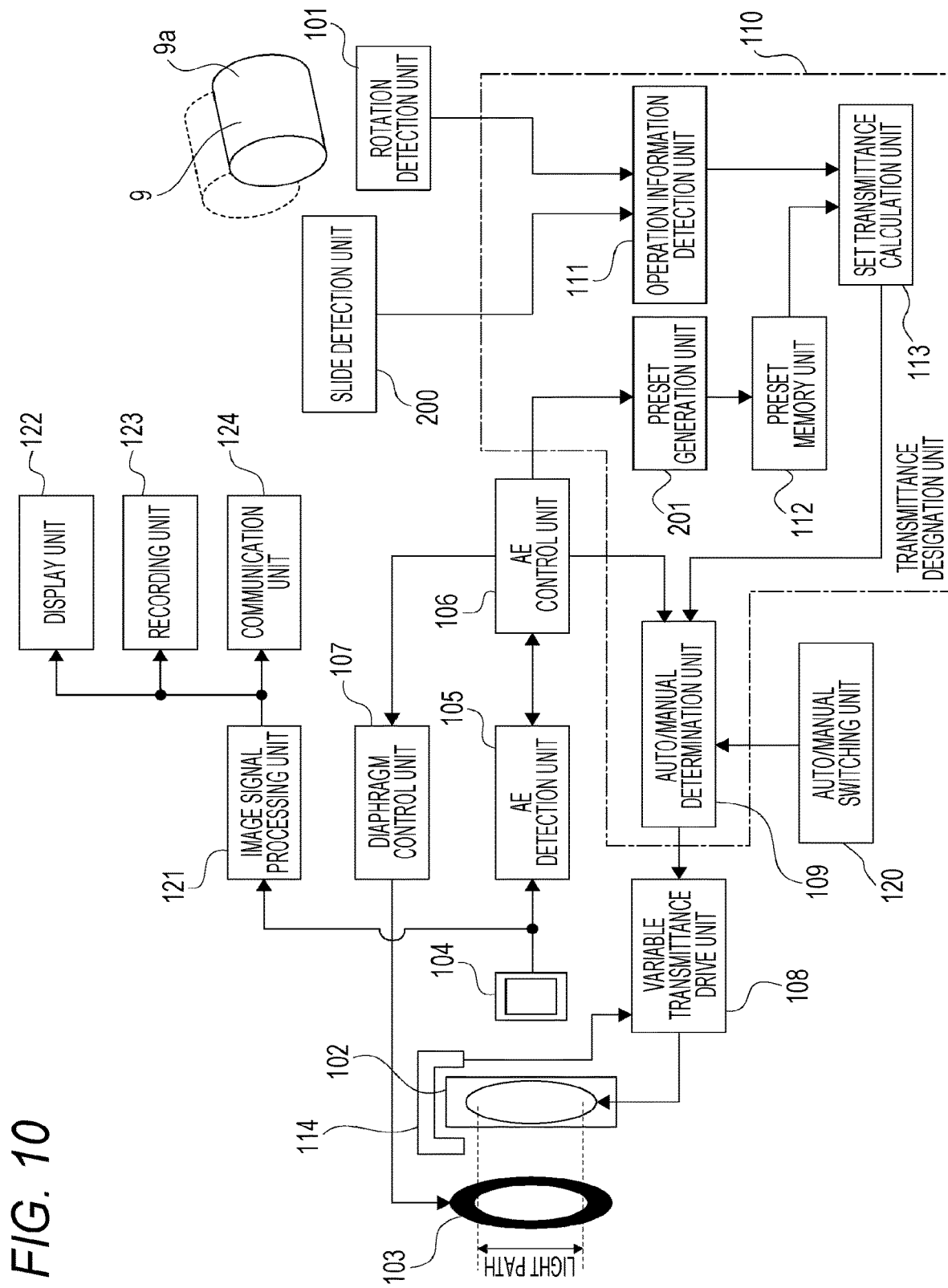
FIG. 10 is a block diagram of an example internal configuration of an imaging apparatus according to the fourth embodiment.

FIG. 10 shows an example internal configuration of an imaging apparatus 1 in the case of the fourth embodiment.

The differences from the configuration shown in FIG. 3 are that a slide detection unit 200 and a preset generation unit 201 are provided. The other components are the same as those shown in FIG. 3, and therefore, are denoted by the same reference numerals as those used in FIG. 3. Explanation of them is not repeated herein.

The preset generation unit 201 is one of the functions of the transmittance designation unit 110.

The slide detection unit 200 detects the first state or the second state as a slide position of the rotating member 9a. That is, as described above, the slide detection unit 200 is a component that outputs a high-level or low-level detection signal, depending on the slide position, as described above. As this detection signal is supplied to the operation information detection unit 111, the set transmittance calculation unit 113 can determine the first state or the second state.

The preset generation unit 201 generates a transmittance of the variable neutral density filter 102 for appropriate exposure as preset information, on the basis of information about the difference from the appropriate exposure as obtained by the AE control unit 106, the aperture size of the diaphragm 103, and the state of the transmittance of the variable neutral density filter 102.

In this example, preset numbers selectable in the preset mode are set as "1" to "9", for example. In this case, the transmittance of the variable neutral density filter 102 to achieve the appropriate exposure is registered with the preset number "5", which is the median of the preset numbers. The preset numbers "4" to "1" are set in a direction in which the transmittance is raised in increments of 0.5 EV, and the preset numbers "6" to "9" are set in a direction in which the transmittance is lowered in increments of 0.5 EV.

Note that, for the preset numbers "1" to "4" and "6" to "9", the increments can be set as appropriate by the user.

For example, in a case where the difference from the appropriate exposure calculated by the AE control unit 106 is 2 EV darker when the current aperture size of the diaphragm 103 is F4 while the current transmittance of the variable neutral density filter 102 is "1/32", the exposure will converge to the appropriate exposure if the transmittance is raised (made brighter) by 2 EV.

Therefore, "1/8" is registered with the preset number "5", "1/4", "1/4", "1/4", and "29/164" are stored as the transmittance control values for the preset numbers "1" to "4", and "1/11", "1/16", "1/22", and "1/32" are stored as the transmittance control values for the preset numbers "6" to "9".

Note that the preset numbers "1", "2", and "3" all have the transmittance of "1/4". This is because the maximum transmittance of the variable neutral density filter 102 is "1/4", and this is an example in which the same value is set as described above in a case where the transmittance has reached the setting limit.

These values are merely internal values, and the transmittance of which the user is to be notified is sent through predetermined quantization.

This function is executed when a preset automatic setting function is permitted by a user instruction, manual setting is performed by the auto/manual switching unit 120, and switching from the variable mode to the preset mode is detected by the slide detection unit 200. Otherwise, the information in the preset memory unit 112 is not to be changed by the preset generation unit 201.

Figure 11:
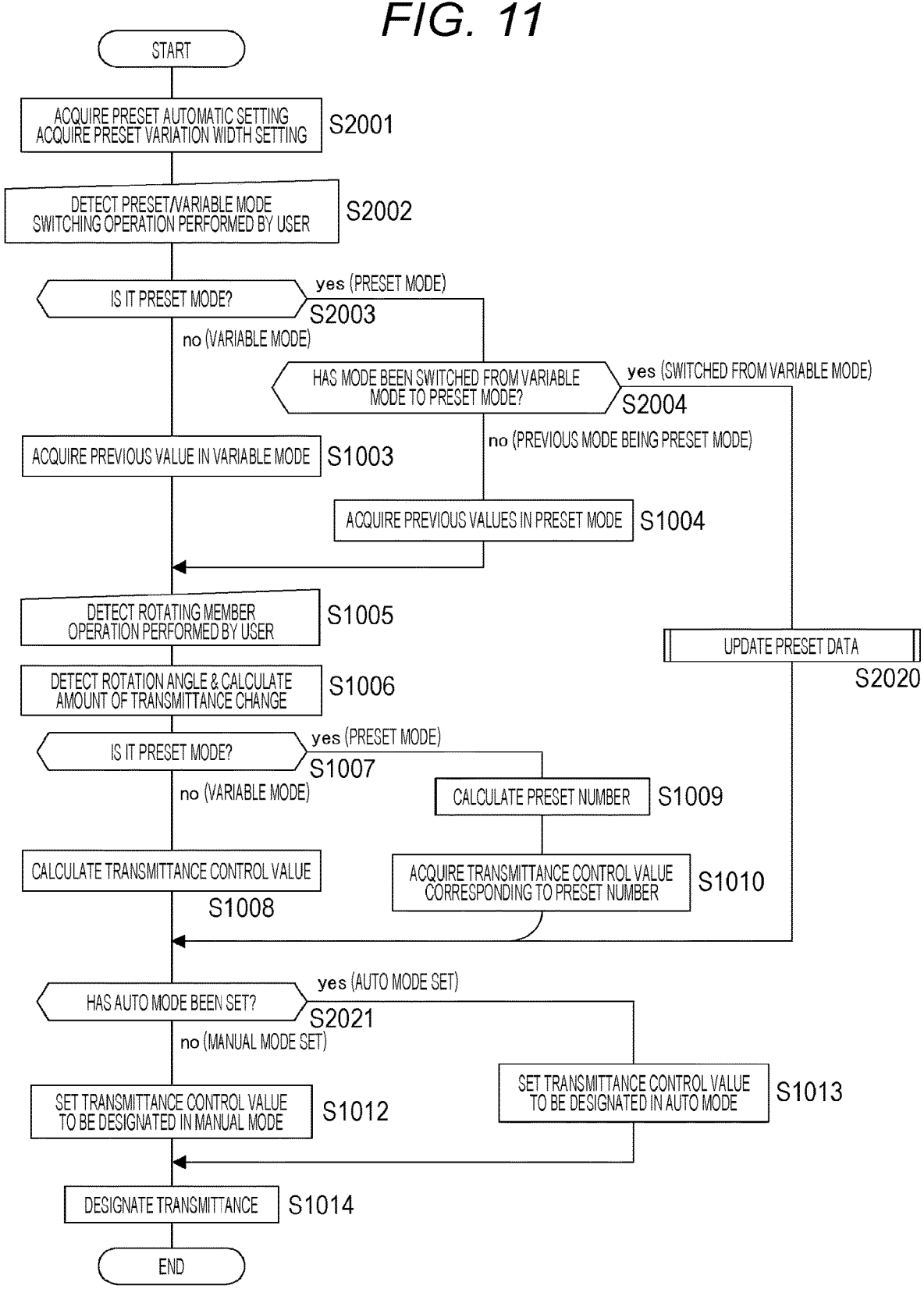
FIG. 11 is a flowchart of a transmittance setting process according to the fourth embodiment.

FIG. 11 shows a flowchart of a process to be performed according to 7 as the fourth embodiment, in response to a transmittance operation in this embodiment.

The process shown in FIG. 11 is repeated in cycles of 100 msec, for example, and changes in the operation system are monitored.

In step S2001, the transmittance designation unit 110 acquires a preset automatic setting state and preset variation width setting. Both can be set by the user through a user interface (not shown) of the imaging apparatus, and the state changes when the user designates a state.

If the preset automatic setting is in a permitted state, the preset automatic setting by the preset generation unit 201 is put into in a valid state, and the increments for the transmittance between the preset numbers when the preset automatic setting is valid are determined by the preset variation width setting. After completion of this step, the process moves on to step S2002.

In step S2002, the transmittance designation unit 110 detects a switching operation for the preset mode or the variable mode from the user. That is, the first state or the second state according to a sliding operation of the rotating member 9a by the transmittance designation unit 110 is detected.

An operation from the user may be received at any point in the sequence. In the internal processing, however, an output signal of the slide detection unit 200 that detects a slide positional state is checked only in this step. After the slide position of the transmittance operator 9 is detected in this step, the process moves on to step S2003.

In step S2003, the transmittance designation unit 110 determines whether the operating state of the variable neutral density filter 102 is the preset mode or is the variable mode.

Mode determination is performed on the basis of the slide positional state acquired in step S2002. The process moves on to step S2004 in the case of the preset mode, and moves on to step S1003 in the case of the variable mode.

In a case where the process moves on to step S1003, the processes in steps S1003, S1005, S1006, S1007, and S1008 are performed as in the first embodiment shown in FIG. 5.

In step S2004, the transmittance designation unit 110 determines whether the current polling control cycle is the switching timing at which the operation mode switches from the variable mode to the preset mode.

If the operation mode is the variable mode at the time of the previous polling control (about 100 msec earlier), the process moves on to step S2020, and if not, the process moves on to step S1004.

In a case where the process moves on to step S1004, the processes in steps S1004, S1005, S1006, S1007, S1009, and S1010 are performed as in the first embodiment shown in FIG. 5.

If this is the timing at which the operation mode is switched from the variable mode to the preset mode, the transmittance designation unit 110 performs a preset data update process in step S2020.

Figure 12:
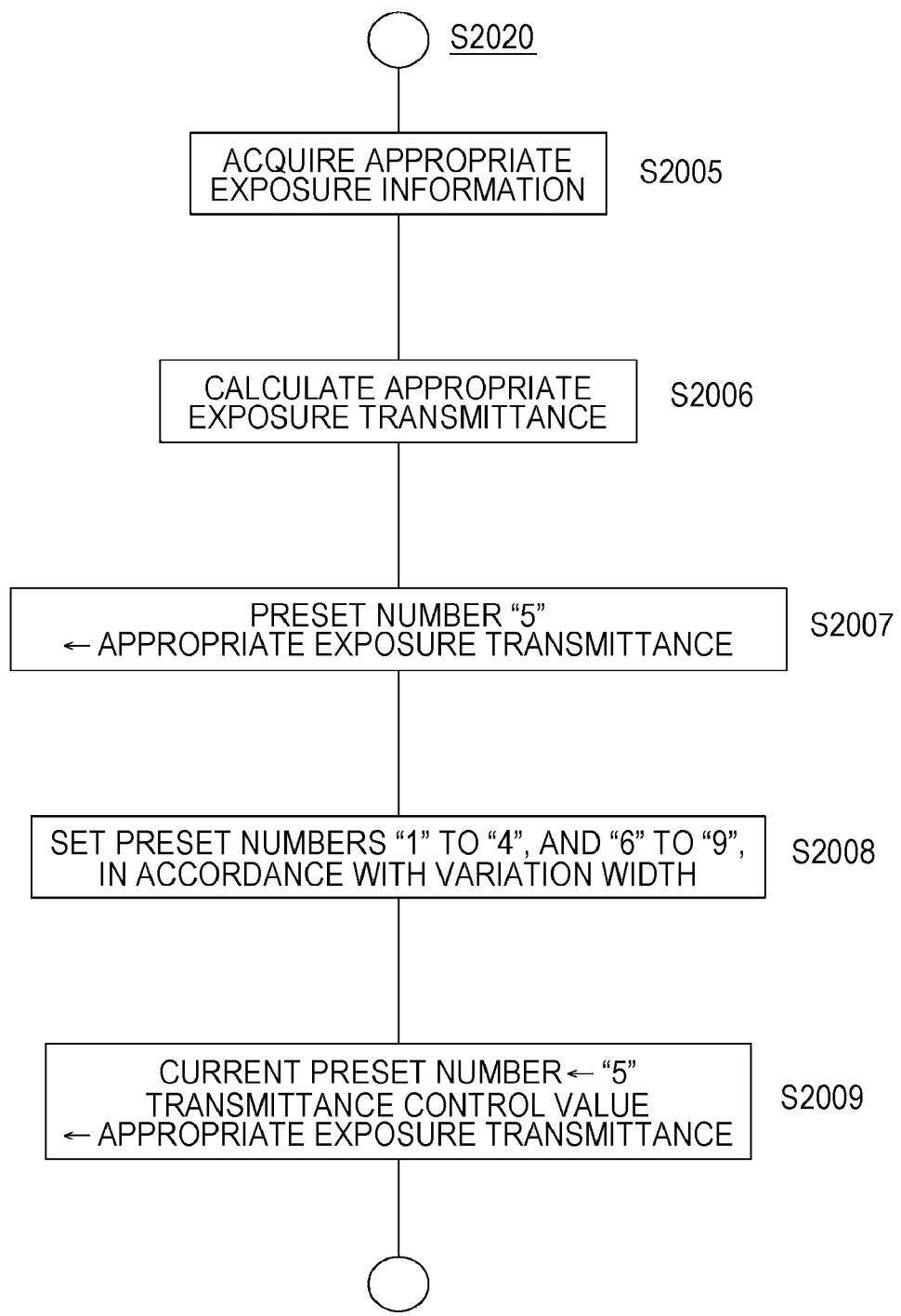
FIG. 12 is a flowchart of preset data update according to the fourth embodiment.

FIG. 12 shows this process in step S2020 in detail.

In step S2005 in FIG. 12, the transmittance designation unit 110 acquires appropriate exposure information from the AE control unit 106, using the preset generation unit 201.

The appropriate exposure information includes information about the difference between the appropriate exposure and actual exposure light entering the imaging device 104, the aperture size of the diaphragm 103 at a time of exposure, the current aperture size of the diaphragm 103, and the transmittance of the variable neutral density filter 102 at a time of exposure. The appropriate exposure may be a predetermined exposure amount provided for an imaging apparatus, or may be any exposure amount that can be set as appropriate by the user.

In step S2006, the transmittance designation unit 110 calculates the transmittance of the variable neutral density filter 102 to achieve the appropriate exposure, using the preset generation unit 201.

The actual exposure is the quantity of light limited by the aperture size of the diaphragm 103 at a time of exposure and the transmittance of the variable neutral density filter 102 at a time of exposure, and the difference between the current exposure amount and the target appropriate exposure is calculated to make it clear how much the diaphragm 103 or the variable neutral density filter 102 should be operated. However, this is based on the assumption that the object remains the same.

Further, there is some delay during the period from the exposure at the imaging device 104 till the calculation by the AE control unit 106. Therefore, in a case where the aperture size of the diaphragm 103 has changed since the exposure timing, the current aperture size of the diaphragm 103 and the exposure result are not associated with each other. Therefore, the current aperture size of the diaphragm 103 is acquired. The relative displacement amount of the transmittance of the variable neutral density filter 102 is calculated from the information about the difference from the appropriate exposure, the difference between the aperture size of the diaphragm 103 at the time of exposure and the current aperture size of the diaphragm 103 is reflected in the relative displacement amount, and the relative displacement amount is added to the transmittance of the variable neutral density filter 102 at the time of exposure. In this manner, the transmittance of the variable neutral density filter 102 to achieve the appropriate exposure is calculated.

In step S2007, the transmittance designation unit 110 stores the appropriate exposure transmittance of the variable neutral density filter 102 calculated in step S2006, into the preset memory unit 112.

For example, the appropriate exposure transmittance is stored at "5", which is the median of the preset numbers. This is because the preset number can be equivalently changed back and forth. For example, in view of the region in which the transmittance of the variable neutral density filter 102 can be set (from "¼" to "¹⁄₁₂₈"), if the appropriate exposure transmittance is close to a setting end, the storage position of the appropriate exposure transmittance may be shifted from the preset number "5".

For example, if the appropriate exposure transmittance is ⅛, the appropriate exposure transmittance is stored at the preset number "3", so that the transmittance "¼" does not continue from the preset number "1" to the preset number "3" as described above.

In step S2008, the transmittance designation unit 110 sets the transmittances (transmittance control values) to be associated with the remaining preset numbers "1" to "4" and "6" to "9", and stores the transmittances into the preset memory unit 112. In this case, the appropriate exposure transmittance to be stored at the reset number "5" is used as the reference, and transmittances are set at regular intervals on the basis of the preset variation width setting acquired in step S2001.

In step S2009, the transmittance designation unit 110 forcibly sets the current preset number at "5" with the set transmittance calculation unit 113, and acquires the transmittance control value (=the appropriate exposure transmittance) associated with the preset number "5" from the preset memory unit 112.

After completion of this step, the process moves on to step S2021 in FIG. 11.

In step S2021 in FIG. 11, the setting of the auto mode or the manual mode by the auto/manual switching unit 120 is checked.

Note that, in each of the example processes in FIGS. 5, 6, and 7, this step is carried out as step S1000. In the example shown as a modification thereof in FIG. 11, however, this step is carried out as step S2021.

In step S2021, the transmittance designation unit 110 determines whether or not the control on the transmittance of the variable neutral density filter 102 is in the auto mode. The transmittance designation unit 110 moves on to step S1013 in the case of the auto mode setting, and moves on to step S1012 in the case of the manual mode setting.

In step S1012, the transmittance designation unit 110 sets the transmittance control value to be directed to the variable transmittance drive unit 108 in the manual mode.

Specifically, in a case where the process moves from step S1008 on to step S1012, the transmittance designation unit 110 sets the transmittance control value calculated in step S1008 as the transmittance control value to be directed to the variable transmittance drive unit 108.

In a case where the process moves from step S1010 on to step S1012, on the other hand, the transmittance designation unit 110 sets the transmittance control value acquired from the preset memory unit 112 in step S1010 as the transmittance control value to be directed to the variable transmittance drive unit 108.

Further, in a case where the process moves from step S2020 on to step S1012, the transmittance designation unit 110 sets the transmittance control value (=the appropriate exposure transmittance) acquired from the preset number "5" in the preset memory unit 112 in step S2020, as the transmittance control value to be directed to the variable transmittance drive unit 108.

In step S1014, the transmittance designation unit 110 then supplies the transmittance control value to the variable transmittance drive unit 108, to designate the transmittance.

As a result, in the manual mode, the transmittance control value in the variable mode or the preset mode is set in accordance with an operation of the transmittance operator 9, and thus, the transmittance of the variable neutral density filter 102 is controlled.

Furthermore, at the point of time when the operation mode is switched from the variable mode to the preset mode, the state of the calculated appropriate exposure transmittance is set, and, for example, the preset number at that point of time is "5", which is the median of the preset numbers.

Note that, in a case where the process moves on to step S1013 in the auto mode, the transmittance designation unit 110 discards the output value of the set transmittance calculation unit 113, and determines that the transmittance control value calculated by the AE control unit 106 on the basis of AE detection is the final transmittance control value. In step S1014, the transmittance designation unit 110 notifies the variable transmittance drive unit 108 of the transmittance control value.

As described above, the transmittance of the variable neutral density filter 102 to achieve the appropriate exposure is set at the same time as switching to the preset mode, so that an operation corresponding to push AE can be performed.

Some examples of the advantages thereof are that it is possible to dramatically shorten the operation time during which the rotating member 9a needs to be operated until the appropriate exposure is obtained once the previous value is carried over, and that it is possible to reduce the trouble of changing the preset information (the preset number and the transmittance) in a case where the transmittance for achieving the appropriate exposure does not exist in the preset memory unit 112. The trouble of changing the preset information may be the trouble the user has to take in registering the preset information again in a case where the setting for "⅛" is not stored with the preset numbers "1" to "9", though "⅛" is the appropriate exposure, for example.

In the case of a diaphragm, the image quality is affected by the depth of field, induction of a diffraction phenomenon, or the like. In the case of a variable neutral density filter, on the other hand, only the light quantity is increased or decreased. Thus, an appropriate exposure amount can be provided without affecting the user's image production (mainly in terms of image quality).

Note that, an example of the transmittance operator 9 and an example process of determining the appropriate exposure and updating the preset data have been described as the fourth embodiment. However, these two examples are not necessarily related to each other.

For example, in a case where the transmittance operator 9 has the configuration shown in FIG. 2, it is of course possible to adopt the processes shown in FIGS. 11 and 12.

<7. Fifth Embodiment>

As a fifth embodiment, another example form of the transmittance operator 9 is now described with reference to FIG. 13.

FIG. 13 schematically shows an example of the transmittance operator 9 as in FIG. 2.

In the case of the example shown in FIG. 13, the transmittance operator 9 does not include the pressing portion 9b, and switches modes and designates a transmittance only with the rotating member 9a.

The rotating member 9a has no rotating ends, and can rotate in both directions.

The rotating member 9a changes from a non-pushed-in state (a first state) shown in FIG. 13A to a pushed-in state (a second state) shown in FIG. 13B. That is, the rotating member 9a is a mechanism that can be displaced in the rotation axis direction.

For example, the operation mode is the variable mode when the rotating member 9a is in the first state shown in FIG. 13A, and is the preset mode when the rotating member 9a is in the second state shown in FIG. 13B.

The internal mechanism may be a structure that comes into contact with an electrode of the main frame side at a time of the first state, and forms an electric circuit in a short-circuited state. In that state, the low level is detected. At a pushed-in position in the second state, the electrode is removed to form an open state, and the high level is detected. This is output as a sensor output, and the position of the rotating member 9a is detected.

Such a transmittance operator 9 may be an operating unit in a case where the processes according to the first to fourth embodiments described above are applied.

<8. Sixth Embodiment>

As a sixth embodiment, an example in which the feels during operations in the respective modes are varied so as to clearly indicate the difference between the preset mode and the variable mode by operational feelings is now described.

Specifically, in the variable mode, a smooth operational feeling is generated during a rotating operation of the rotating member 9a. In the preset mode, a clicking feeling is generated during a rotating operation of the rotating member 9a. Particularly, the preset numbers are changed by a rotation amount with which a clicking feeling is obtained.

In a case where the transmittance operator 9 has the structure shown in FIG. 2, the internal gear mechanism is changed in conjunction with pressing of a member when the pressing portion 9b is pressed.

In the variable mode, a smooth rotating operation with a constant torque feeling is provided. In the preset mode, a rotating operation that generates a clicking feeling eight times per rotation of the rotating member 9a is provided. The number of times a clicking feeling is generated is eight in a case where the preset numbers "1" to "8" are prepared.

The timing to switch the preset numbers (transmittances) and the clicking timing are then synchronized with each other, so that user-friendliness can be further increased.

In a case where the transmittance operator 9 has the structure shown in FIG. 9, the gear mechanism is reconfigured in response to a change in the slide position in the first state or the second state. At a time of the preset mode at the slide position in the second state, a clicking feeling is generated nine times (in the case with the preset numbers "1" to "9") per rotation of the rotating member 9a. At the slide position in the first state, no clicking feelings are generated, and stepless adjustment can be performed by the mechanism.

In a case where the transmittance operator 9 has the structure shown in FIG. 13, the gear mechanism is reconfigured in response to a change in the pushed-in position in the first state or the second state. At a time of the preset mode at the pushed-in position in the second state, a clicking feeling is generated nine times (in the case with the preset numbers "1" to "9") per rotation of the rotating member 9a.

In the first state, no clicking feelings are generated, and stepless adjustment can be performed by the mechanism.

Instead of mechanically generating clicking feelings in the preset mode, it is also possible to generate vibration with a vibrator.

Figure 14:
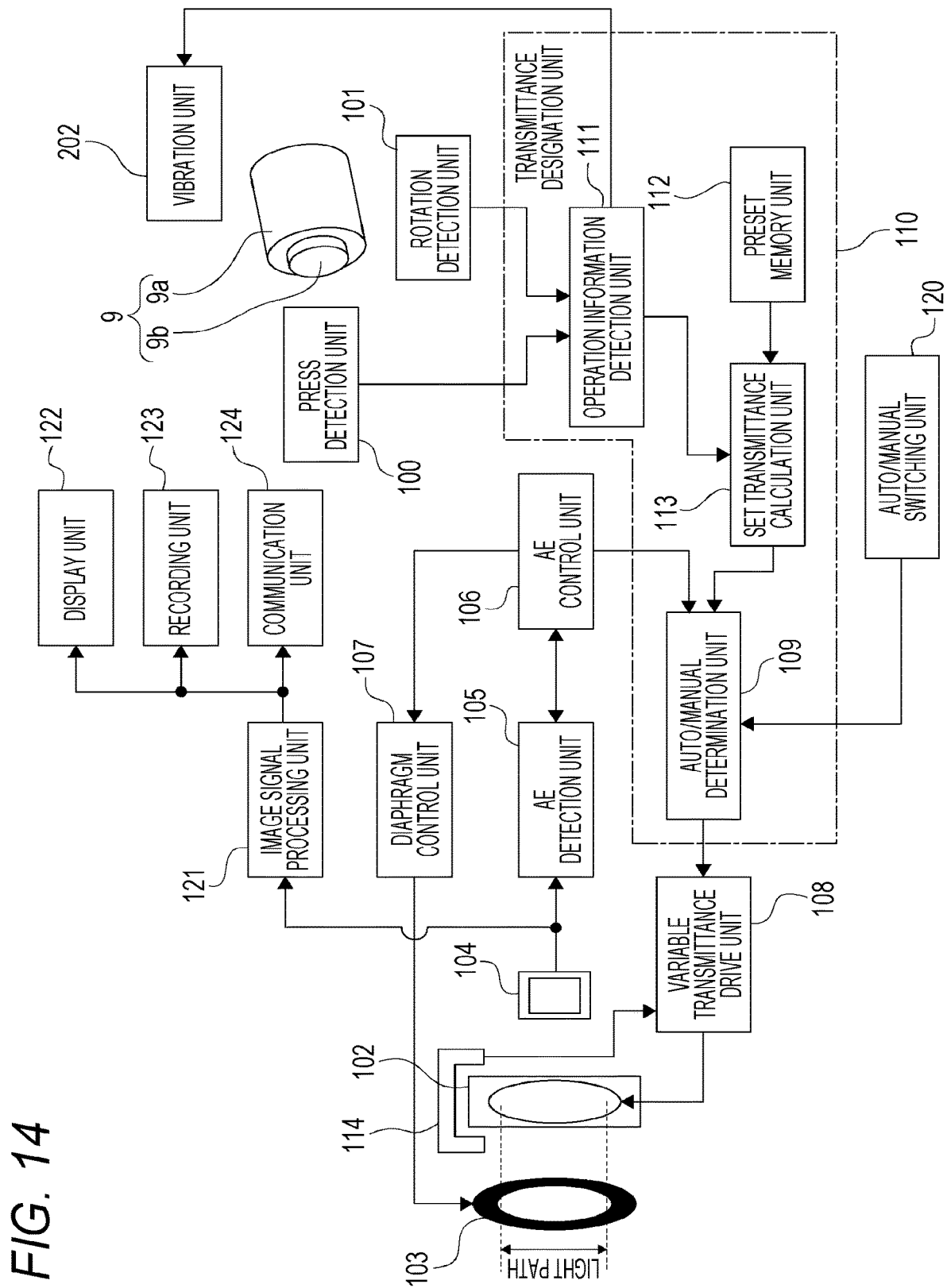
FIG. 14 is a block diagram of an example internal configuration of an imaging apparatus according to a sixth embodiment.

FIG. 14 shows an example configuration in which a vibration unit 202 is added to the structure shown in FIG. 3. As a so-called vibrator mechanism, the vibration unit 202 generates vibration from rotation of a vibrator.

The vibration unit 202 is controlled by the operation information detection unit 111, for example.

When detecting that the rotating operation amount of the rotating member 9a has become an operation amount that causes a preset number change in the preset mode, the operation information detection unit 111 drives the vibration unit 202.

In this manner, clicking operational feelings corresponding to a preset number change can be given to the user, and a preset number selecting operation by the rotating member 9a can be made easier to understand.

<9. Optical Block Mechanism Including a Variable Neutral Density Filter>

The following is a description of the configuration of an optical block 10 including the variable neutral density filter 102 (see FIGS. 15 to 21).

Note that, in the description below, the forward, rearward, vertical, and transverse directions are as viewed from the imaging apparatus operator, with the lens barrel 8 attached to the main frame unit 3 of the imaging apparatus 1. Accordingly, the object side is the front side, and the imaging apparatus operator side is the rear side.

Note that the forward, rearward, vertical, and transverse directions described below are used for ease of explanation, and implementations of the present technology are not limited to these directions.

Figure 15:
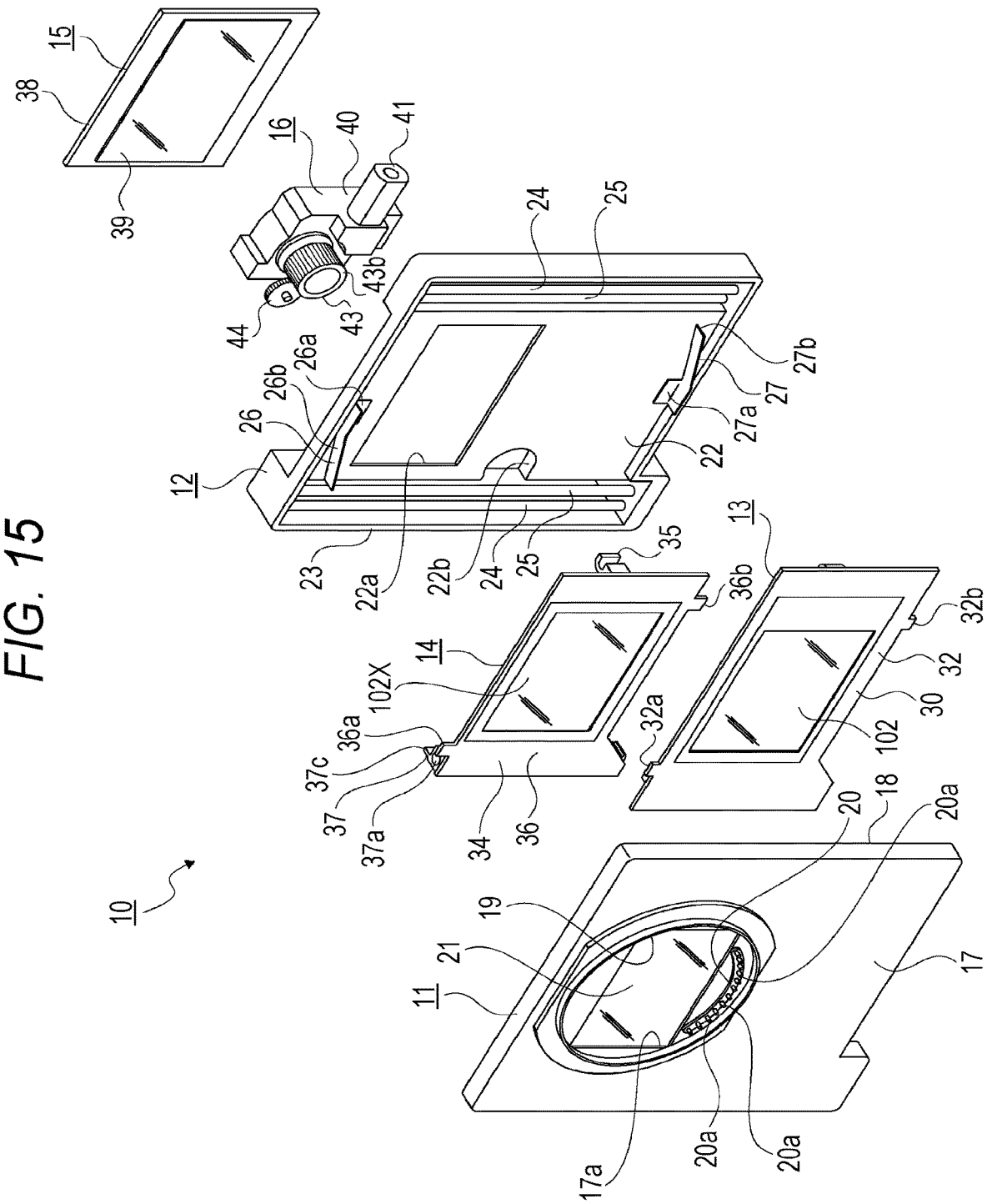
FIG. 15 is an exploded perspective view of an optical block according to an embodiment.
Figure 16:
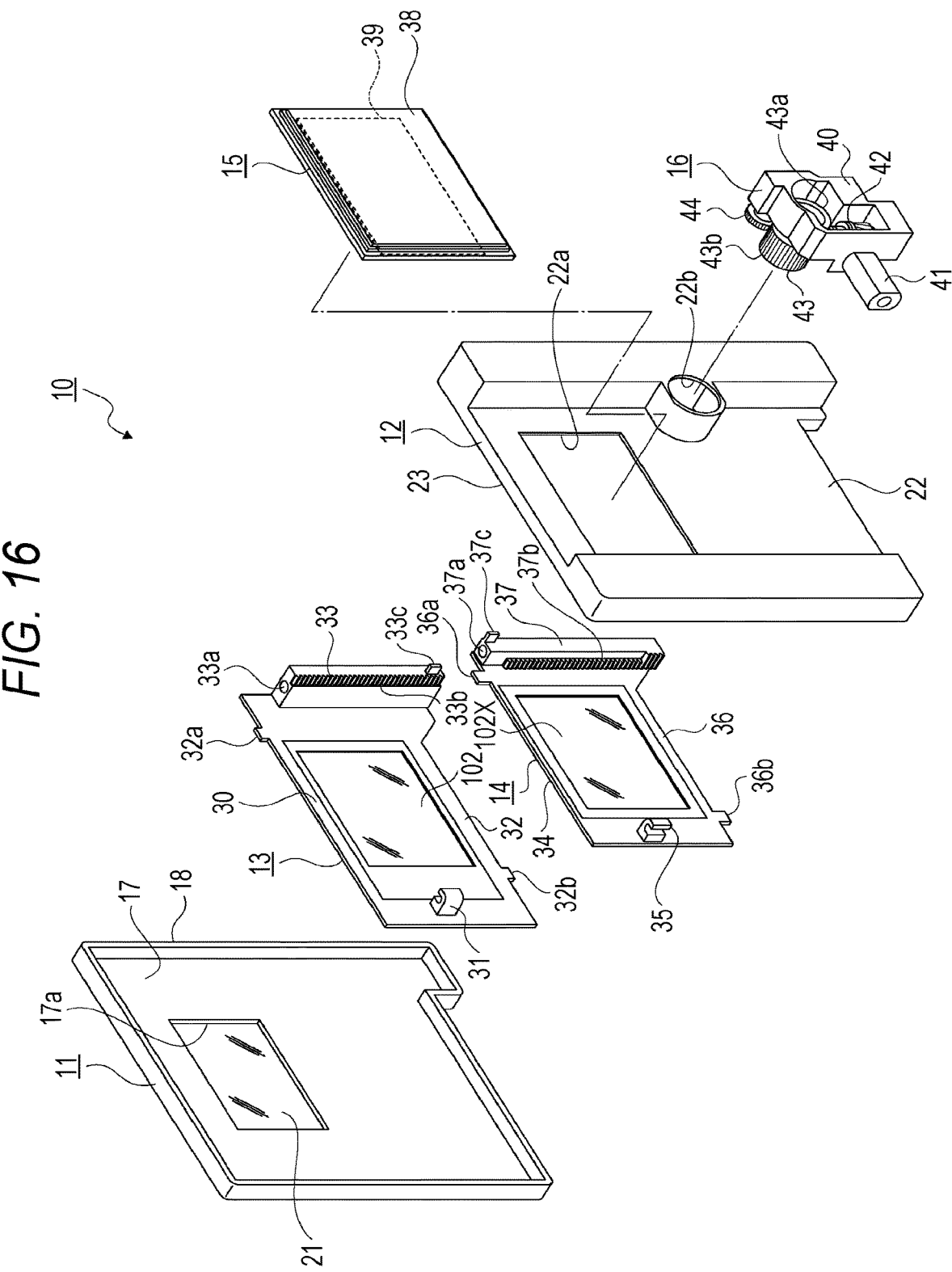
FIG. 16 is an exploded perspective view of the optical block as viewed from a direction different from that in FIG. 15.
Figure 17:
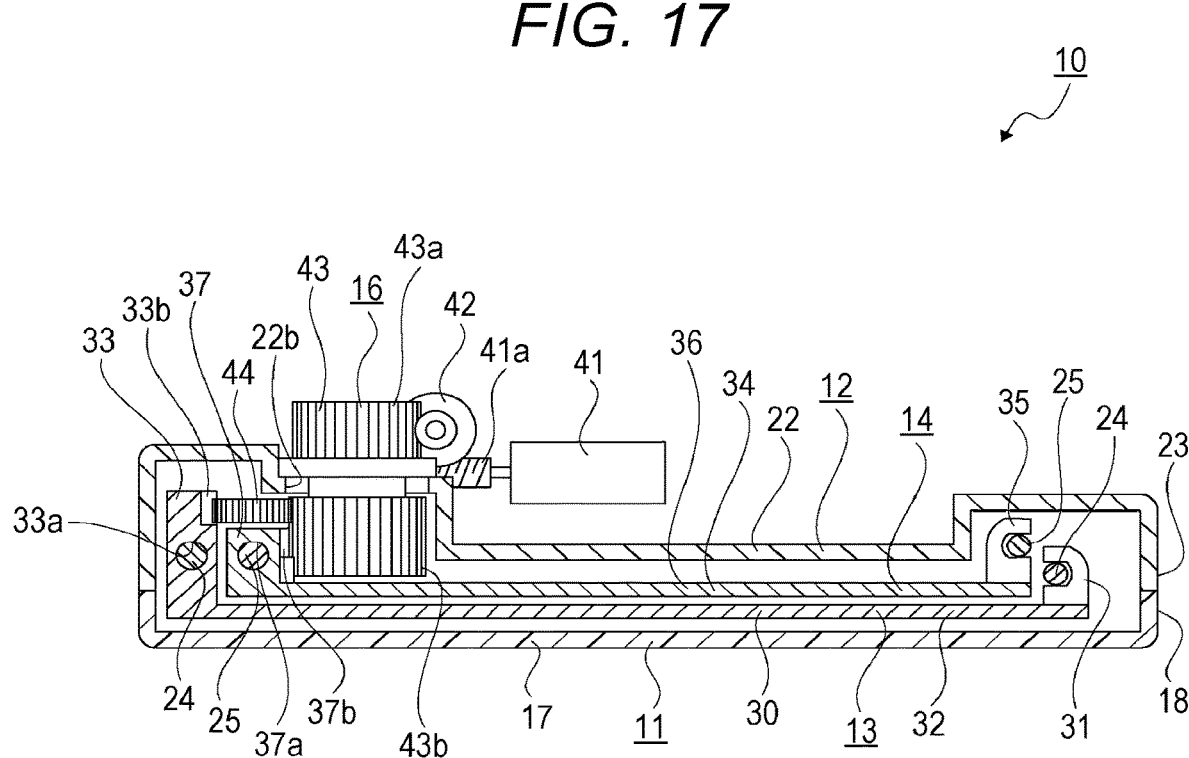
FIG. 17 is a cross-sectional view of the optical block, cut at a position including the drive mechanism.

The optical block 10 is disposed immediately behind the panel unit 4 inside the main frame unit 3, and includes a front base 11, a rear base 12, a first movable unit 13, a second movable unit 14, a device unit 15, and a drive mechanism 16 (see FIGS. 15 to 17).

The front base 11 includes: a base surface portion 17 that is formed in a substantially rectangular plate-like shape facing the front and rear sides; and a joining frame portion 18 that protrudes rearward from the outer peripheral portion of the base surface portion 17. The front base 11 has a rectangular transmission opening 17a in the upper half of the base surface portion 17. An annular portion 19 that protrudes forward is formed around the transmission opening 17a of the front base 11. A terminal placement portion 20 is provided on the inner peripheral side of the lower end portion of the annular portion 19, and a plurality of connection terminals 20a is disposed side by side in the circumferential direction in the terminal placement portion 20.

In a state where the lens barrel 8 is attached to the main frame unit 3, a plurality of electrode portions (not shown) provided on the rear end surface of the lens barrel 8 is connected to the respective connection terminal portions 20a. Thus, the main frame unit 3 and the lens barrel 8 are electrically connected to each other, and transmission and reception of signals and the like become possible between the main frame unit 3 and the lens barrel 8.

An infrared cut filter 21 is attached to the front base 11 so as to cover the transmission opening 17a from the rear side. The infrared cut filter 21 absorbs the light in the infrared region of external light taken in through the lens barrel 8, and the light suitable for imaging travels in the direction of the imaging device unit 104.

The rear base 12 includes: an attachment base portion 22 that is formed in a substantially rectangular plate-like shape facing the front and rear sides; and an outer frame portion 23 that protrudes forward from the outer peripheral portion of the attachment base portion 22. The rear base 12 has a rectangular incidence opening 22a in the upper half of the attachment base portion 22. In the attachment base portion 22, an insertion hole 22b penetrating forward and rearward is formed immediately below the incidence opening 22a. The insertion hole 22b is formed at a position closer to one end portion of the attachment base portion 22 in the transverse direction.

In the rear base 12, placement spaces 12a and 12b that are open on the front side are formed at both right and left end portions, respectively.

Figure 18:
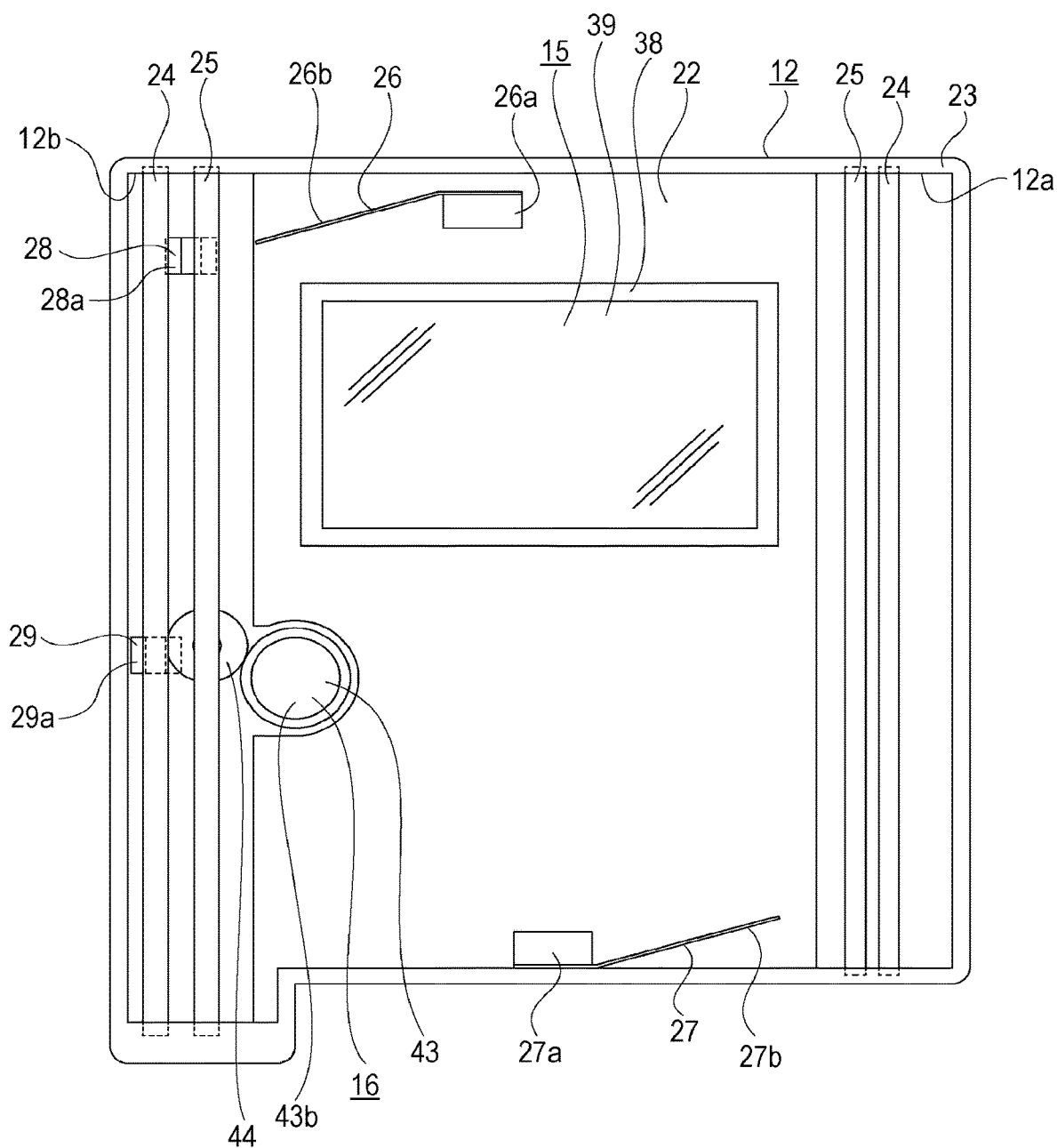
FIG. 18 is a front view of the optical block, with the first movable unit and the second movable unit being supported.

First guide shafts 24 and 24 and second guide shafts 25 and 25 are attached to the rear base 12 (see FIGS. 17 and 18).

The axial direction of the first guide shafts 24 and 24 are the vertical direction, and the first guide shafts 24 and 24 are attached to the rear base 12, as the upper and lower end portions are attached to the upper and lower end portions of the outer frame portion 23, respectively. The first guide shafts 24 and 24 are disposed in the placement spaces 12a and 12b, respectively.

The axial direction of the second guide shafts 25 and 25 is the vertical direction, and the second guide shafts 25 and 25 are attached to the rear base 12, as the upper and lower end portions are attached to the upper and lower end portions of the outer frame portion 23, respectively. The second guide shafts 25 and 25 are located in the placement spaces 12a and 12b, on the inner side of the first guide shafts 24 and 24, respectively.

A first spring 26 and a second spring 27 are attached to upper and lower end portions of the front surface of the attachment base portion 22, respectively.

The first spring 26 and the second spring 27 are leaf springs, for example, and include attached portions 26a and 27a and elastic deformation portions 26b and 27b, respectively. In the first spring 26, the attached portion 26a is attached to the upper end portion of the attachment base portion 22, and the elastic deformation portion 26b is elastically deformable in a substantially vertical direction with respect to the attached portion 26a.

In the second spring 27, the attached portion 27a is attached to the lower end portion of the attachment base portion 22, and the elastic deformation portion 27b is elastically deformable in a substantially vertical direction with respect to the attached portion 27a.

The elastic deformation portion 26b of the first spring 26 and the elastic deformation portion 27b of the second spring 27 are positioned closer to both end portions in the transverse direction of the attachment base portion 22.

The photodetector 28 and the photodetector 29 are attached to one end portion of the attachment base portion 22 in the transverse direction, and are separated from each other in the vertical. The photodetectors 28 and 29 are attached to the attachment base portion 22, penetrating the attachment base portion 22 in the forward/rearward direction. The front end portions thereof serve as detection portions 28a and 29a, respectively. The detection portions 28a and 29a are located in the placement space 12b, and each include a pair of protrusions separated from each other in the transverse direction.

The first movable unit 13 includes a filter holding portion 30, the variable neutral density filter 102, and a bearing 31 (see FIGS. 15 and 16).

The filter holding portion 30 includes a holding frame 32 having a substantially rectangular shape, and a guided projection 33 that projects rearward from one end portion of the holding frame 32 in the transverse direction.

The holding frame 32 includes an upper protruding portion 32a that protrudes upward, and a lower protruding portion 32b that protrudes downward. The upper protruding portion 32a is disposed at a position closer to one end portion in the transverse direction, and the lower protruding portion 32b is disposed at a position closer to the other end portion in the transverse direction.

A bearing hole 33a that vertically penetrates the guided projection 33 is formed in the guided projection 33. A rack portion 33b is formed on one surface of the guided projection 33 in the transverse direction. A detection target piece 33c protruding rearward is formed at the lower end portion of the guided projection 33.

The outer peripheral portion of the variable neutral density filter 102 is attached to the inner peripheral portion of the holding frame 32 in the filter holding portion 30, and the thickness direction of the variable neutral density filter 102 matches the optical axis direction (the forward/rearward directions) in the first movable unit 13. The variable neutral density filter 102 is a neutral density (ND) filter, and functions as a variable electronic filter whose light transmittance changes when a voltage is applied.

The bearing 31 is attached to the rear surface of the other end portion of the holding frame 32 in the transverse direction, and is open on the side of the rack portion 33b.

The second movable unit 14 includes a filter holding portion 34, a transparent filter 102X, and a bearing 35. The filter holding portion 34 includes a holding frame 36 having a substantially rectangular shape, and a guided projection 37 that projects rearward from one end portion of the holding frame 36 in the transverse direction. The size of the second movable unit 14 in the transverse direction is smaller than the size of the first movable unit 13 in the transverse direction, and the amount of projection of the guided projection 37 from the holding frame 36 is smaller than the amount of projection of the guided projection 33 from the holding frame 32 in the first movable unit 13.

The holding frame 36 includes an upper protruding portion 36a that protrudes upward, and a lower protruding portion 36b that protrudes downward. The upper protruding portion 36a is disposed at a position closer to one end portion in the transverse direction, and the lower protruding portion 36b is disposed at a position closer to the other end portion in the transverse direction.

A bearing hole 37a that vertically penetrates the guided projection 37 is formed in the guided projection 37. A rack portion 37b is formed on one surface of the guided projection 37 in the transverse direction. A detection target piece 37c protruding rearward is formed at the upper end portion of the guided projection 37.

The outer peripheral portion of the transparent filter 102X is attached to the inner peripheral portion of the holding frame 36 in the filter holding portion 34, and the thickness direction of the transparent filter 102X matches the optical axis direction in the second movable unit 14. No voltage is applied to the transparent filter 102X, and the transparent filter 102X does not have the functions of a variable electronic filter.

The bearing 35 is attached to the rear surface of the other end portion of the holding frame 36 in the transverse direction, and is open on the opposite side from the rack portion 37b.

Figure 19:
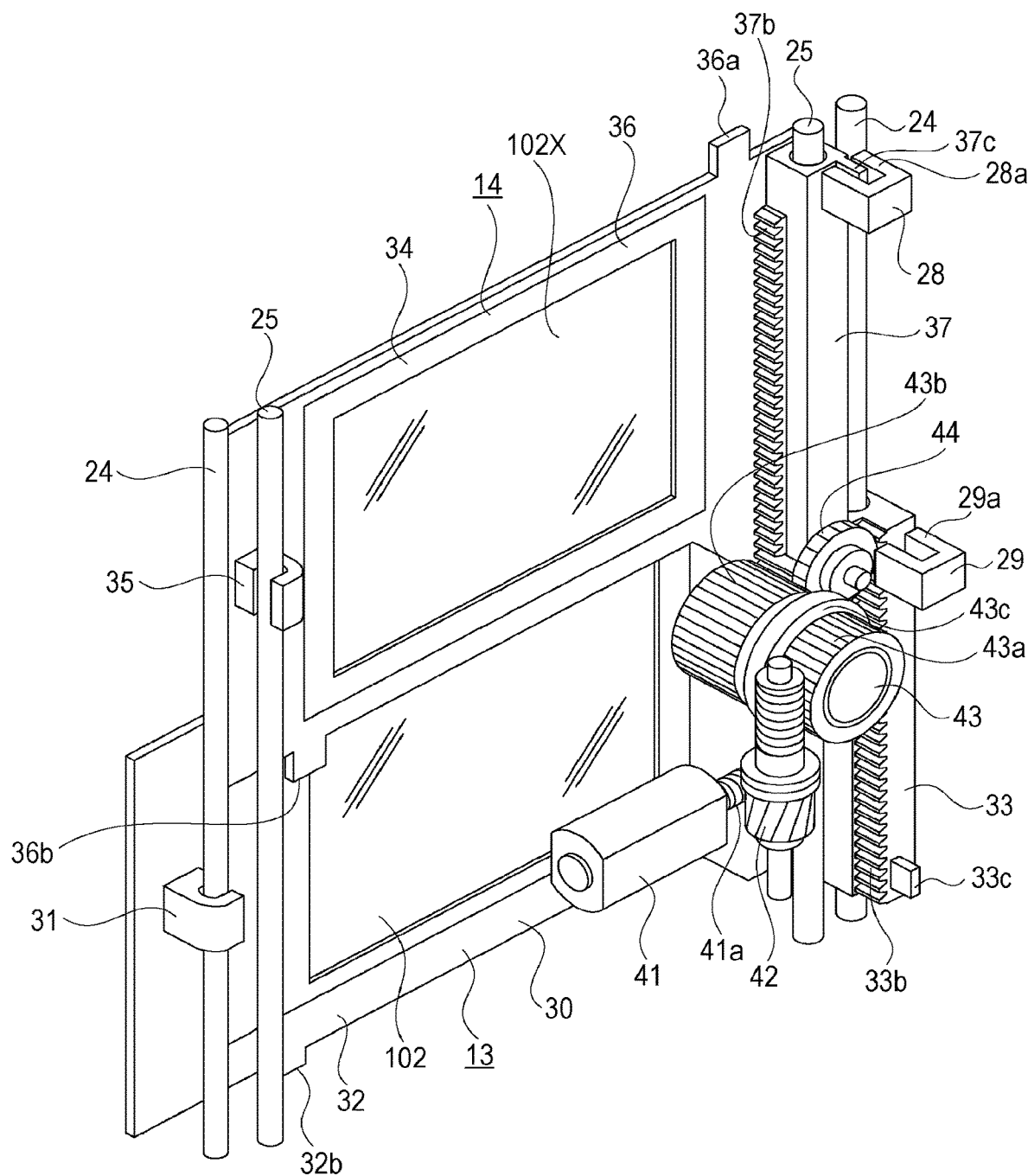
FIG. 19 is a perspective view of the optical block, excluding some of the components.

In the first movable unit 13, one first guide shaft 24 is inserted into the bearing hole 33a, the other first guide shaft 24 is inserted into the bearing 31, and the guided projection 33 and the bearing 31 are guided by the first guide shafts 24 and 24, respectively, so that the first movable unit 13 can be moved in the vertical direction with respect to the rear base 12 (see FIG. 19).

Also, in the second movable unit 14, one second guide shaft 25 is inserted into the bearing hole 37a, the other second guide shaft 25 is inserted into the bearing 35, and the guided projection 37 and the bearing 35 are guided by the second guide shafts 25 and 25, respectively, so that the second movable unit 14 can be moved in the vertical direction with respect to the rear base 12.

In the first movable unit 13 at this stage, the filter holding portion 30 is located on the front side of the filter holding portion 34 of the second movable unit 14, and the guided projection 33 and the bearing 31 are located on the outer side of the guided projection 37 and the bearing 35 of the second movable unit 14 in the transverse direction. Accordingly, the first movable unit 13 and the second movable unit 14 do not interfere with each other, and can be movable independently of each other in the vertical direction with respect to the rear base 12.

In a state where the first movable unit 13 and the second movable unit 14 are movable in the vertical direction with respect to the rear base 12, the joining frame portion 18 of the front base 11 and the outer frame portion 23 of the rear base 12 are brought into contact with each other in the forward/rearward direction and are joined, and the first movable unit 13 and the second movable unit 14 are made movable in the vertical direction between the front base 11 and the rear base 12 (see FIG. 17).

The device unit 15 includes the imaging device unit 104, and has a holding frame 38 formed in a rectangular frame-like shape and an imaging device 39 held by the holding frame 38 (see FIGS. 15 and 16).

The drive mechanism 16 is formed with the respective necessary components attached to or supported by a case member 40, and includes a drive motor 41, a worm gear 42, a drive gear 43, and a reversing gear 44 (see FIGS. 16 and 19).

The axial direction of the motor shaft of the drive motor 41 is the transverse direction, and a gear 41a is fixed to the motor shaft. The gear 41a is engaged with the drive gear 43 via the worm gear 42 whose axial direction is the vertical direction.

The drive gear 43 has its axial direction in the forward/rearward direction, and includes a transmission gear portion 43a and a power gear portion 43b that are coaxially arranged. The transmission gear portion 43a and the power gear portion 43b are joined by a joining member 43c, and the transmission gear portion 43a and the power gear portion 43b are rotated integrally and synchronously with the joining member 43c.

The reversing gear 44 is engaged with the power gear portion 43b, and is rotated in a direction opposite to the power gear portion 43b, in conjunction with the rotation of the power gear portion 43b.

In the drive mechanism 16, the case member 41 is attached to the rear surface of the attachment base portion 22 in the rear base 12, the joining member 43c is inserted into the insertion hole 22b, and the reversing gear 44 and the power gear portion 43b are disposed on the front surface side of the attachment base portion 22 (see FIGS. 17 to 19).

The reversing gear 44 is engaged with the rack portion 33b of the first movable unit 13, and the power gear portion 43b is engaged with the rack portion 37b of the second movable unit 14. Accordingly, the first movable unit 13 is moved in the vertical direction as the reversing gear 44 is rotated by the driving force of the drive motor 41, and the second movable unit 14 is moved in the vertical direction as the power gear portion 43b is rotated by the driving force of the drive motor 41.

The upper moving ends of the first movable unit 13 and the second movable unit 14 are located in front of the imaging device 39, and are the light transmission positions at which light entering the variable neutral density filter 102 or the transparent filter 102X via the infrared cut filter 21 can be transmitted.

The lower moving ends of the first movable unit 13 and the second movable unit 14 are retraction positions for retracting downward from the front side of the imaging device 39, and light is not transmitted through the variable neutral density filter 102 or the transparent filter 102K at the retraction positions.

Since the reversing gear 44 and the power gear portion 43b are rotated in opposite directions to each other when the drive motor 41 is driven, the moving direction of the first movable unit 13 and the moving direction of the second movable unit 14 are opposite directions. When the first movable unit 13 is moved upward, the second movable unit 14 is moved downward in synchronization with the first movable unit 13. When the first movable unit 13 is moved downward, the second movable unit 14 is moved upward in synchronization with the first movable unit 13. Also, the first movable unit 13 and the second movable unit 14 are moved in opposite directions in the vertical direction while passing each other in the optical axis direction.

The first movable unit 13 and the second movable unit 14 are moved on the basis of control according to a predetermined operation.

Figure 20:
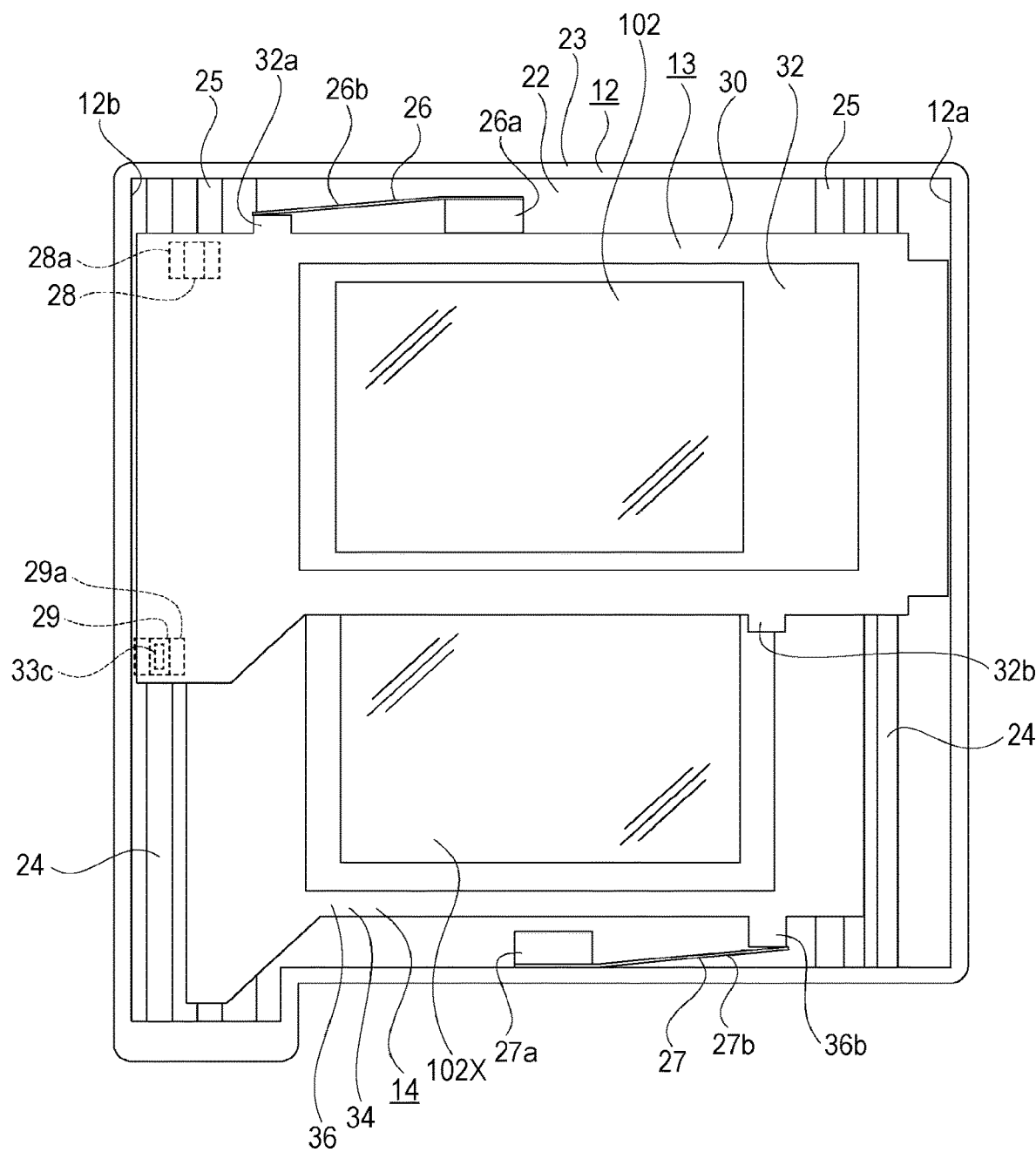
FIG. 20 is a front view of the optical block in a state in which the first movable unit is moved to the light transmission position, and the second movable unit is moved to the retraction position.
Figure 21:
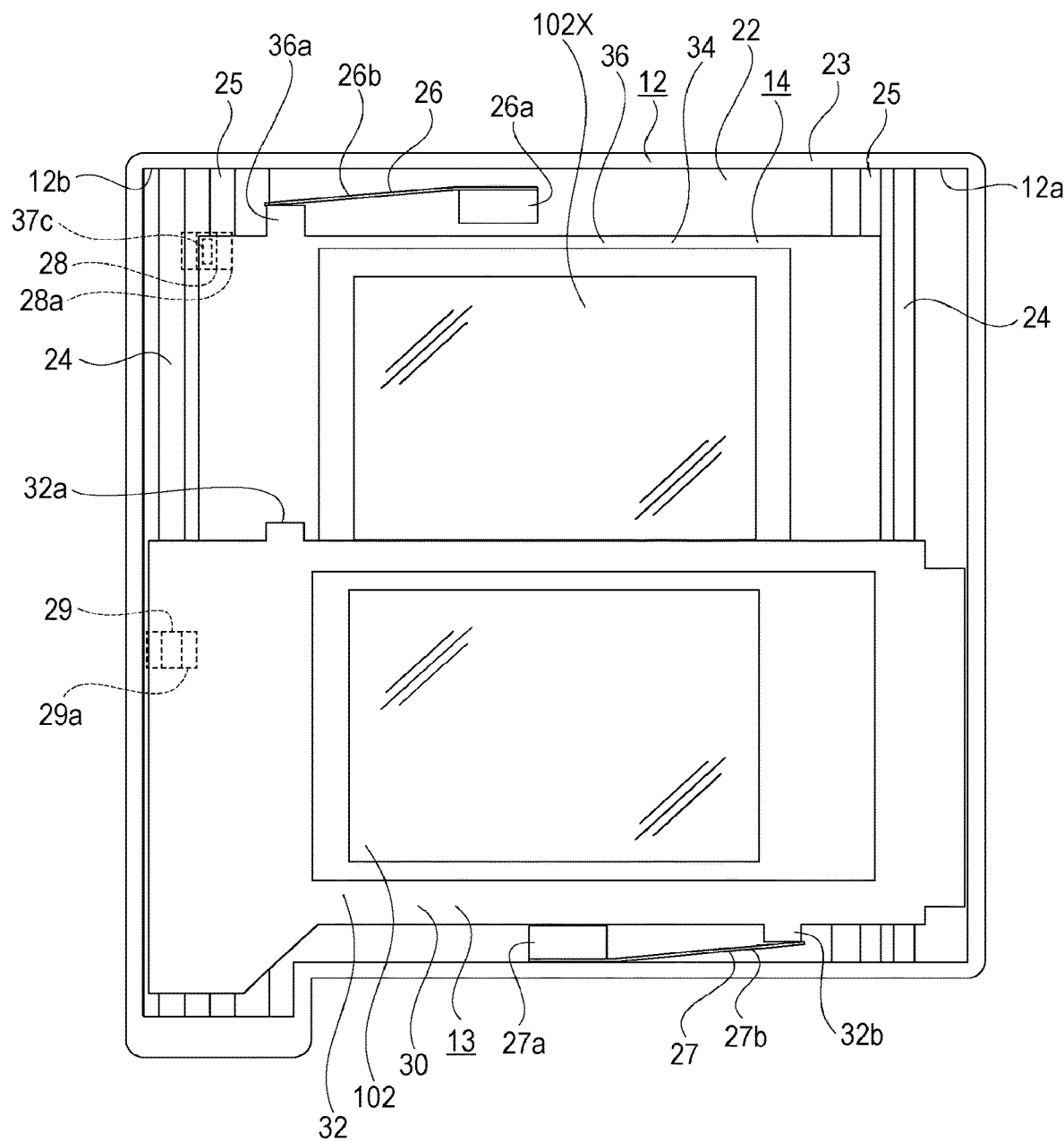
FIG. 21 is a front view of the optical block in a state in which the second movable unit is moved to the light transmission position, and the first movable unit is moved to the retraction position.

When the first movable unit 13 is moved upward and the detection target piece 33c is inserted between the pair of protrusions of the detection portion 29a in response to the predetermined operation, the photodetector 29 detects the first movable unit 13 moved to the light transmission position, the driving of the drive motor 41 is stopped, and the first movable unit 13 is held at the light transmission position (see FIG. 20).

When the first movable unit 13 is moved upward to the light transmission position, the driving of the drive motor 41 is stopped. At this point of time, the upper protruding portion 32a is brought into contact with the elastic deformation portion 26b of the first spring 26 from below, and a downward biasing force generated by the first spring 26 is applied to the first movable unit 13. Thus, the gear teeth of the reversing gear 44 are pressed against the rack teeth of the rack portion 33b, and the occurrence of backlash is prevented.

In this case, the second movable unit 14 is moved downward to the retraction position, the lower protruding portion 36b is brought into contact with the elastic deformation portion 27b of the second spring 27 from above, and an upward biasing force generated by the second spring 27 is applied to the second movable unit 14. Thus, the gear teeth of the power gear portion 43b are pressed against the rack teeth of the rack portion 37b, and the occurrence of backlash is prevented.

On the other hand, when the second movable unit 14 is moved upward and the detection target piece 37c is inserted between the pair of protrusions of the detection portion 28a in response to the predetermined operation, the photodetector 28 detects the second movable unit 14 moved to the light transmission position, the driving of the drive motor 41 is stopped, and the second movable unit 14 is held at the light transmission position. When the second movable unit 14 is moved upward to the light transmission position, the driving of the drive motor 41 is stopped. At this point of time, the upper protruding portion 36a is brought into contact with the elastic deformation portion 26b of the first spring 26 from below, and a downward biasing force generated by the first spring 26 is applied to the second movable unit 14. Thus, the gear teeth of the power gear portion 43b are pressed against the rack teeth of the rack portion 37b, and the occurrence of backlash is prevented.

In this case, the first movable unit 13 is moved downward to the retraction position, the lower protruding portion 32b is brought into contact with the elastic deformation portion 27b of the second spring 27 from above, and an upward biasing force generated by the second spring 27 is applied to the first movable unit 13. Thus, the gear teeth of the reversing gear 44 are pressed against the rack teeth of the rack portion 33b, and the occurrence of backlash is prevented.

As described above, in a state where the first movable unit 13 and the second movable unit 14 are moved to the light transmission position and the retraction position, backlash between the rack portions 37b and 33b and the reversing gear 44 or the power gear portion 43b is prevented. Accordingly, there are no periods of time during which power is not transmitted from the drive motor 41 to the first movable unit 13 and the second movable unit 14 at the start of movement of the first movable unit 13 and the second movable unit 14 from the light transmission position or the retraction position to the retraction position or the light transmission position. Thus, it is possible to ensure high positional accuracy regarding the movement zones of the first movable unit 13 and the second movable unit 14.

Also, as the occurrence of backlash is prevented by the first spring 26 and the second spring 27, the structure for preventing the occurrence of backlash is simple, and it is possible to ensure high positional accuracy regarding the movement zones of the first movable unit 13 and the second movable unit 14 while ensuring the simplification of the structure of the optical block 10.

As described above, in a state where the first movable unit 13 is moved to the light transmission position, the light transmittance changes with a voltage applied to the variable neutral density filter 102, and the quantity of light entering the imaging device 39 is controlled, so that the use of the variable neutral density filter 102 can reduce the quantity of light entering the imaging device 39, without affecting color development.

As the variable neutral density filter 102 is used in this manner, it is possible to reduce the quantity of light entering the imaging device 39, without affecting color development. Accordingly, even if the shutter speed is lowered, for example, overexposure hardly occurs, so-called blown out highlights that are white portions in an image are prevented, and the image quality of the image to be captured can be increased.

Further, the light transmittance in the variable neutral density filter 102 can be set to a desired transmittance by an operation of the rotating member in the transmittance operator 9, and the second movable unit 14 is moved to the light transmission position, so that the quantity of light to be transmitted to the imaging device 39 can be maximized with the transparent filter 102X.

Accordingly, the variable neutral density filter 102 and the transparent filter 102K can increase the fluctuation range of the amount of light to be transmitted to the imaging device 39, and it is possible to capture a desired image in accordance with the use and preference of the user. Thus, it is possible to increase the usability of the imaging apparatus 1 while increasing image quality.

Further, the optical block 10 includes the drive mechanism 16 that synchronously moves the first movable unit 13 and the second movable unit 14 in opposite directions, and one of the first movable unit 13 and the second movable unit 14 is moved to the retraction position while the other is moved to the light transmission position.

Accordingly, when the first movable unit 13 is moved to the light transmission position by the drive mechanism 16, the second movable unit 14 is moved to the retraction position. When the second movable unit 14 is moved to the light transmission position by the drive mechanism 16, the first movable unit 13 is moved to the retraction position. As a result, the first movable unit 13 and the second movable unit 14 are moved to the light transmission position or the retraction position by one drive mechanism 14. Thus, the structure of the imaging apparatus 1 is simplified, and both the first movable unit 13 and the second movable unit 14 can be moved to predetermined positions.

Further, both the first movable unit 13 and the second movable unit 14 are moved between the light transmission position and the retraction position, and accordingly, the first movable unit 13 and the second movable unit 14 are moved in the same moving range. Therefore, there is no need to set the moving ranges of the first movable unit 13 and the second movable unit 14 independently of each other, and the moving ranges of the first movable unit 13 and the second movable unit 14 can be minimized. Thus, the imaging apparatus 1 can be made smaller in size.

Furthermore, the first movable unit 13 and the second movable unit 14 are moved toward the light transmission position or the retraction position while passing each other.

Accordingly, the first movable unit 13 and the second movable unit 14 are moved to the light transmission position or the retraction position while moving in proximity to each other. Thus, the movement space of the first movable unit 13 and the movement space of the second movable unit 14 are small, and the size of the imaging apparatus 1 can be reduced further.

Further, in the first movable unit 13, the thickness direction of the variable neutral density filter 102 coincides with the optical axis direction. In the second movable unit 14, the thickness direction of the transparent filter 102X coincides with the optical axis direction. The first movable unit 13 and the second movable unit 14 are moved in a direction orthogonal to the optical axis direction.

Accordingly, the first movable unit 13 and the second movable unit 14 are moved in a direction orthogonal to the optical axis direction, while the thickness directions coincide with the optical axis directions. Thus, the first movable unit 13 and the second movable unit 14 do not need any movement space in the optical axis direction, and the imaging apparatus 1 can be made smaller in size in the optical axis direction.

Figure 22:
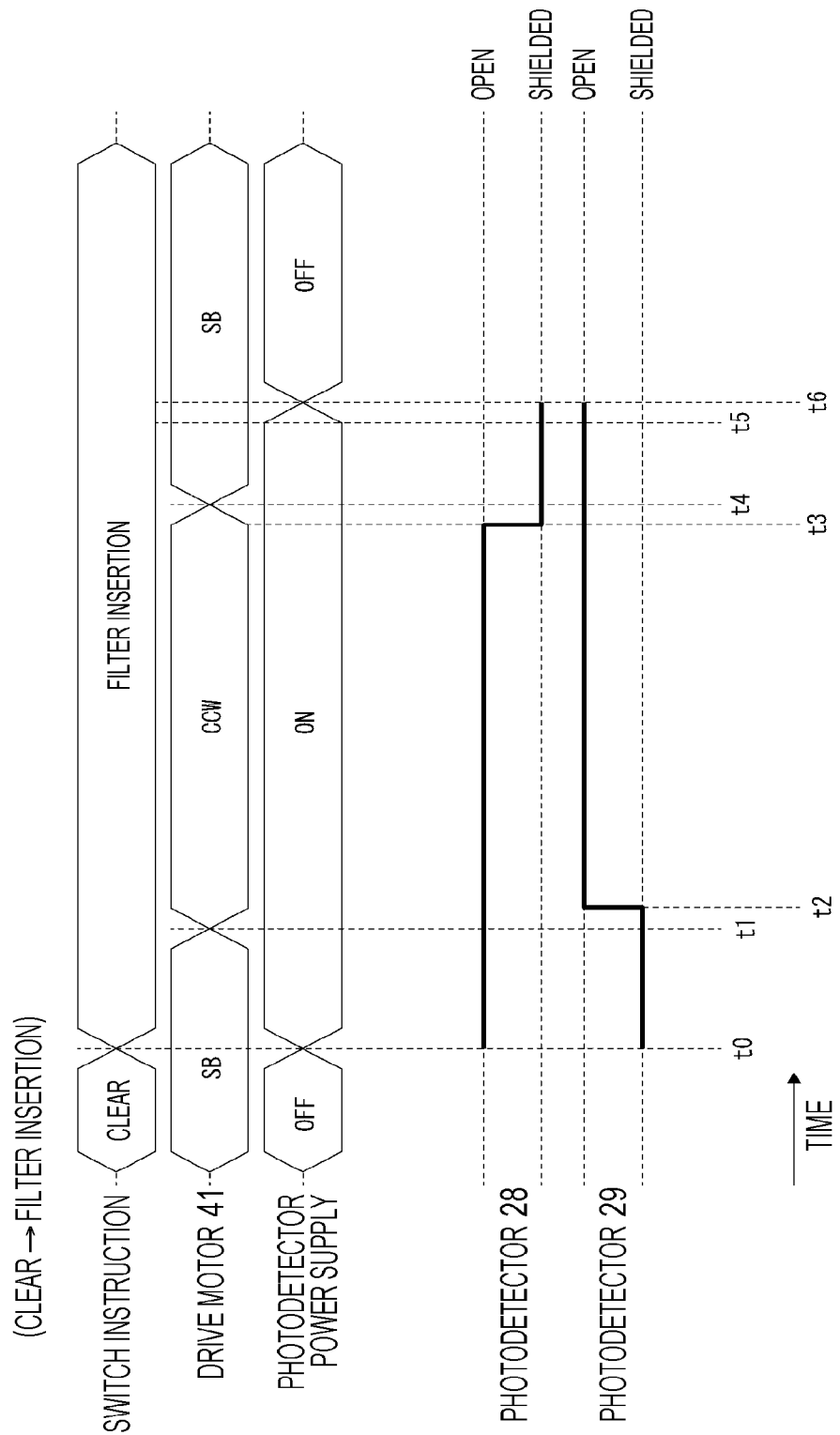
FIG. 22 is a chart for explaining an operation at a time of insertion of a variable neutral density filter according to an embodiment.

Referring now to FIGS. 22 and 23, the timing to control insertion/removal of the variable neutral density filter 102 by driving the first movable unit 13 is described.

As can be seen from the above structure, there are physically two fixed positions of the variable neutral density filter 102. One of the two fixed positions is a position (hereinafter referred to as the "insertion position") at which the variable neutral density filter 102 is in contact with the incident light path of the object light connecting the aperture plane of the diaphragm 103 and the imaging device unit 104, as shown in FIG. 3.

The other is a position (hereinafter referred to as the "removal position") at which the incident light path and the variable neutral density filter 102 are not in contact with each other.

FIG. 22 is a timing chart in a case where the variable neutral density filter 102 is moved from the removal position to the insertion position. FIG. 23 is a timing chart in a case where the variable neutral density filter 102 is moved from the insertion position to the removal position.

Each chart shows an instruction to switch between an inserted state and a removed state in response to a predetermined operation, the rotation state of the drive motor 41, the state of power supply to the photodetectors 28 and 29, the detection output of the photodetector 28, and the detection output of the photodetector 29.

An operation at a time of insertion of the variable neutral density filter 102 is described with reference to FIG. 22.

At time t0, a filter insertion switch instruction is issued. At this point of time, power supply to the photodetectors 28 and 29 is started. Note that, when insertion/removal is not being performed, the power supply to the photodetectors 28 and 29 is turned off to reduce unnecessary power consumption.

As the power supply is started at time t0, the photodetectors 28 and 29 output detection signals corresponding to the state at that time. At this point of time, the variable neutral density filter 102 (the first movable unit 13) is at the removal position, and accordingly, the output of the photodetector 28 is at the high level in an open state (a state where there are no objects that shield the photointerrupter from light). Meanwhile, the output of the photodetector 29 is at the low level in a shielded state (a state where there is an object that shields the photointerrupter from light).

Note that the drive motor 41 is in a standby state (shown as "SB").

A period between time t0 and time t1 is regarded as a position check time. A control unit (a microcomputer having the functions of the transmittance designation unit 110, for example) that controls operations to insert/remove the variable neutral density filter 102 confirms the positional state of the first movable unit 13 from detection signals of the photodetectors 28 and 29.

When the above control unit confirms that the first movable unit 13 is at the removal position through the check, the removal control unit 117 causes the drive motor 41 to perform counterclockwise rotation (shown as "CCW") from time t1.

Movement of the first movable unit 13 to the insertion position is started at time t1 by the counterclockwise rotation of the drive motor 41. After that, at time t2, the first movable unit 13 moves upward, and the photodetector 29 is no longer shielded from light. As a result, the output switches to the high level.

After that, the first movable unit 13 moves upward, and reaches the position at which the photodetector 28 is shielded from light at time t3. As a result, the output of the photodetector 28 switches to the low level.

When the output of the photodetector 28 switches to the low level at time t3, the above control unit performs brake control on the drive motor 41. In practice, due to a control delay time, it is time t4 when the counterclockwise rotation of the drive motor 41 stops, and the drive motor 41 enters a standby state.

The period from time t4 to time t5 is regarded as a position check time after movement. That is, the above control unit confirms that the output of the photodetector 28 is at the low level, and the output of the photodetector 29 is at the high level.

After the check, the above control unit performs control to turn off the power supply to the photodetectors 28 and 29 at time t6.

Next, an operation at a time of removal of the variable neutral density filter 102 is described with reference to FIG. 23.

At time t10, an instruction to switch from filter insertion to clearance (a removed state) is issued. At this point of time, power supply to the photodetectors 28 and 29 is started.

As the power supply is started, the photodetectors 28 and 29 output detection signals corresponding to the state at that time. At this point of time, the variable neutral density filter 102 (the first movable unit 13) is at the insertion position, and accordingly, the output of the photodetector 28 is at the high level in a shielded state. Meanwhile, the output of the photodetector 29 is at the low level in an open state.

The period between time t10 and time t11 is regarded as a position check time, and the above control unit confirms the positional state of the first movable unit 13 with detection signals from the photodetectors 28 and 29.

When the above control unit confirms that the first movable unit 13 is at the insertion position through the check, the removal control unit 117 causes the drive motor 41 to perform clockwise rotation (shown as "CW") from time t11.

Movement of the first movable unit 13 to the removal position is started at time t11 by the clockwise rotation of the drive motor 41. After that, at time t12, the first movable unit 13 moves downward, and the photodetector 28 is no longer shielded from light. As a result, the output switches to the high level.

After that, the first movable unit 13 moves downward, and reaches the position at which the photodetector 29 is shielded from light at time t13. As a result, the output of the photodetector 29 switches to the low level.

When the output of the photodetector 29 switches to the low level at time t13, the above control unit performs brake control on the drive motor 41. In practice, due to a control delay time, it is time t14 when the clockwise rotation of the drive motor 41 stops, and the drive motor 41 enters a standby state.

The period from time t14 to time t15 is regarded as a position check time after movement. That is, the above control unit confirms that the output of the photodetector 28 is at the high level, and the output of the photodetector 29 is at the low level.

After the check, the above control unit performs control to turn off the power supply to the photodetectors 28 and 29 at time t16.

Through the above control, the first movable unit (the variable neutral density filter 102) is inserted and removed. When the variable neutral density filter 102 moves from the removal position to the insertion position, the output of the photodetector 28 switches to the low level at the insertion detection position before the insertion position. Also, when the variable neutral density filter 102 moves from the insertion position to the removal position, the output of the photodetector 29 switches to the low level at the removal detection position before the removal position.

This is because it takes a predetermined time from when the above control unit detects a change to the low level to when the control unit gives a stop instruction to the drive motor 41.

If the output of the photodetector 28 switches to the low level when the variable neutral density filter 102 reaches the position at which the variable neutral density filter 102 should stop, the stop cannot be made in time, and the variable neutral density filter 102 collides with a mechanical end, which might lead to damage of a member, or failure or a change in the characteristics of the variable neutral density filter 102. In the above operation, this kind of trouble is avoided, and safe movement control is performed. Further, through the position check processes before and after movement, accurate movement control is performed.

<10. Summary and Modifications>

With the above embodiments, the effects described below are achieved.

An imaging apparatus 1 according to an embodiment includes: the variable neutral density filter 102 that has a variable transmittance; the imaging device unit 104 on which object light via the variable neutral density filter 102 forms an image; and the variable transmittance drive unit 108 that changes the transmittance of the variable neutral density filter 102 in accordance with a transmittance control value. The imaging apparatus 1 also includes: the transmittance operator 9 that is designed for transmittance operations and can be in a first state or in a second state depending on a change in form; and the transmittance designation unit 110.

When the transmittance operator 9 is in the first state, the transmittance designation unit 110 sets a transmittance control value directed to the variable transmittance drive unit 108 in accordance with an operation amount of the transmittance operator 9.

When the transmittance operator 9 is in the second state, on the other hand, the transmittance designation unit 110 selects one transmittance control value in accordance with an operation of the transmittance operator 9 from among a plurality of transmittance control values stored as preset memory, and sets the one transmittance control value as the transmittance control value directed to the variable transmittance drive unit 108.

Accordingly, the transmittance operator 9 can be operated in the variable mode as the first state, and can be operated in the preset mode as the second state. In this configuration, there is no need to prepare independent operating units for the respective modes, and the number of operating units (the number of components) can be reduced. Thus, the configuration of the imaging apparatus 1 can be simplified, and the costs can be lowered.

Furthermore, as the respective operations in the variable mode and the preset mode can be performed with the same operating unit, operability can be increased.

For example, the user does not need to operate different operating units before and after switching between the variable mode and the preset mode, and operations are easily performed while an erroneous operation hardly occurs. Particularly, a camera operator normally gazes at the object being imaged through the display surface 5a, a viewfinder, or the like during imaging. In that state, the camera operator searches for an operating unit in a blind manner, and is likely to operate a wrong operating unit. In the case of this embodiment, on the other hand, a transmittance operation can be performed by a rotating operation of the rotating member 9a in both the variable mode and the preset mode. Accordingly, it is easy for the user to perform a transmittance operation while gazing at the object.

The same operating unit can of course be used for switching between the variable mode and the preset mode, and accordingly, a transmittance operation is easy.

Note that changes in the form of the transmittance operator 9 include a change in appearance, a change in shape, a change in position, a change in internal mechanism state, with respect to all or part of the operating unit. For example, a change in the pressing portion 9b, a change in the position of the rotating member 9a, and the like have been mentioned. However, changes in the form of the transmittance operator 9 may include a change in an integrally formed slider, a change in the knob shape, and the like.

In an embodiment, when the transmittance operator 9 is in the first state, the transmittance designation unit 110 sets the transmittance control value directed to the variable transmittance drive unit 108 in accordance with the operation amount of a specific operation. When the transmittance operator 9 is in the second state, the transmittance designation unit 110 selects one transmittance control value in accordance with the specific operation of the transmittance operator 9 from among the plurality of transmittance control values stored as preset memory, and sets the one transmittance control value as the transmittance control value directed to the variable transmittance drive unit 108.

That is, in both cases of the first state and the second state, the specific operation such as a rotating operation of the rotating member 9a is the operation for changing the transmittance.

In both cases of the variable mode and the preset mode, the user can change the transmittance by performing the specific operation. Accordingly, the user can intuitively understand operations without being conscious of the mode, and user-friendliness is increased.

The specific operation to designate a transmittance change both in the variable mode and in the preset mode is of course not limited to a rotating operation of the rotating member 9a. The specific operation is only required to be performed by a device structure that is the transmittance operator 9. For example, in a case where a slider is adopted, the specific operation may be a sliding operation.

Further, a button operation may be performed by raising or lowering the transmittance in accordance with the number of times a button is pressed or a pressing time, and this pressing operation may be set as the specific operation.

In an embodiment, the transmittance operator 9 includes the rotating member 9a, and the specific operation is an operation to rotate the rotating member 9a.

For example, when the transmittance operator 9 is in the first state, a transmittance changing operation in the variable mode is performed by a rotation operation of the rotating member 9a. When the transmittance operator 9 is in the second state, a selecting operation in the preset mode is performed by a rotating operation of the rotating member 9a.

That is, in both cases of the variable mode and the preset mode, the user can change the transmittance by performing the specific operation to rotate the rotating member 9a. As described above, regardless of the mode, the operation to change the transmittance is the same. Accordingly, the user can intuitively understand operations, and user-friendliness is increased.

Also, in both the variable mode and the preset mode, the rotation direction and the transmittance change direction are the same. Accordingly, the user only has to remember that the transmittance is raised or lowered in accordance with the rotation direction of the rotating member 9a, and does not need to worry about operations.

Using the rotating member 9a to select a preset number in the preset mode is advantageous in a case where the number of preset numbers is to be increased. For example, in a case where the preset operating unit 302 having a slide switch structure is provided as in the comparative example shown in FIG. 4, the sliding range needs to be widened to prepare a large number of preset number, and it is difficult to set such a wide sliding range on the housing 2. With the rotating member 9a, such a problem does not occur, and it is easy to cope with the eight or nine preset numbers described above, for example.

In an example described in the embodiments, the imaging apparatus 1 includes the preset memory unit 112 that stores the plurality of transmittance control values as the preset memory in a rewritable state.

In the case of the preset mode, a transmittance control value stored in the preset memory unit 112 is selected in accordance with an operation of the rotating member 9a.

Since the preset memory unit 112 is rewritable, various transmittance control values can be preset. For example, the preset memory can be updated as upload, or the user can rewrite the preset memory as appropriate or according to the use situation.

Also, the processes according to the fourth embodiment can be performed, because the preset memory unit 112 is rewritable.

In an embodiment, the transmittance designation unit 110 selects one transmittance control value stored in the preset memory unit, when the transmittance operator 9 is switched from the first state to the second state.

For example, the pressing portion 9b is pressed, or the transmittance operator 9 is moved in position and is switched to the second state, so that a certain preset transmittance control value is selected. That is, when the mode is switched to the preset mode, one of the preset states is set. Depending on the selection of the preset number at this point of time, it is possible to quickly control the transmittance to obtain an appropriate transmittance.

Further, the transmittance corresponding to one of the preset numbers has already been obtained at the time when the preset mode is set. Accordingly, even if the preset values are switched by a rotating operation after that, for example, those changes are preset variation widths, and do not cause any feeling of strangeness.

In an example described in the second embodiment, when the transmittance operator 9 is switched from the first state to the second state, the transmittance designation unit 110 selects the preset number that has been selected at last when the transmittance operator 9 was in the second state last time, and notifies the variable transmittance drive unit 108 of the transmittance control value that is stored and is associated with the selected preset number in the preset memory unit 112.

With this arrangement, when the pressing portion 9b is pressed to be switched to the second state, for example, the state returns to the state with the preset number selected in the previous preset mode. Accordingly, the user can use the pressing portion 9b, in terms of a return to the state of the previous preset mode. That is, the user can perform an operation while recognizing the state at the moment of switching to the preset mode. Thus, any unintended light quantity change can be prevented.

Further, in that state, it is possible to select a desired preset number by a rotating operation of the rotating member 9a, for example, and conduct a desired light quantity operation.

In an example described as a modification in the second embodiment, when the transmittance operator 9 is switched from the first state to the second state, the transmittance designation unit 110 notifies the variable transmittance drive unit 108 of the transmittance control value that is stored and is associated with the preset number that was selected at last in the previous second state.

With this arrangement, when the pressing portion 9b is pressed to be switched to the second state, for example, the state returns to the state with the transmittance control value designated in the previous preset mode. Accordingly, the user can use the pressing portion 9b, in terms of a return to the state with the last transmittance of the previous preset mode. This has the same meaning as selecting the last preset number of the previous second state as described above, but also means more reliably returning the transmittance to the previous state. In a case where the preset number is the same as the previous preset number, if the transmittance control value corresponding to the preset number has been rewritten, the transmittance does not become the same as the transmittance in the last state of the previous preset mode. Therefore, instead of the previous preset number, the last transmittance control value in the previous preset mode is stored and used. Thus, even if the preset memory unit 112 has been rewritten, the current preset mode can be started with the same transmittance as that of the previous preset mode.

In an example described in the third embodiment, when the transmittance operator 9 is switched from the first state to the second state, the transmittance designation unit 110 selects the transmittance control value closest to the transmittance control value directed to the variable transmittance drive unit 108 in the most recent first state from among the transmittance control values stored in the preset memory unit 112, and notifies the variable transmittance drive unit 108 of the selected transmittance control value.

Accordingly, when the pressing portion 9b is pressed to be switched to the second state, for example, the preset mode is started in a state close to the transmittance control value designated in the most recent variable mode. That is, a large change in transmittance is prevented when the preset mode is designated. Thus, it is possible to prevent a great change in the light quantity in the image even when the mode is changed during imaging.

Furthermore, the user can select a desired preset number by performing a rotating operation on the rotating member 9a in that state, for example, and conduct a desired light quantity operation.

Note that, this idea can also be applied when the pressing portion 9b is pressed again to be switched to the first state, for example, or when the mode is changed from the preset mode to the variable mode. That is, when the variable mode is started, the last transmittance control value of the most recent preset mode may be used as it is (that is, when the mode is changed from the preset mode to the variable mode, the transmittance is not changed).

Thus, a drastic change in light quantity due to a mode change can be prevented.

Further, in this case, an operation to change the mode to the variable mode is performed, so that the user can change the transmittance as appropriate, with the last transmittance of the preset mode being the starting point. That is, it is possible to provide an operation to perform fine adjustment in the variable mode from the transmittance in the preset mode.

In an example described in the fourth embodiment, the imaging apparatus has a configuration that includes a light quantity detection unit (the AE detection unit 105) that detects the light quantity of the object light, an appropriate exposure amount calculation unit (the AE control unit 106) that calculates the transmittance to be the target exposure amount from the light quantity detected by the light amount detection unit, and the preset memory unit 112 that stores a plurality of transmittance control values as preset memory in a rewritable state. In this configuration, the transmittance designation unit 110 performs a process of causing the preset memory unit 112 to store the transmittance control value for designating the transmittance calculated by the exposure amount calculation unit.

In this case, the transmittance control value to be preset is updated to a desired transmittance control value in accordance with the imaging environment at that point of time.

Specifically, when the mode is switched from the variable mode to the preset mode, the transmittance control value to be preset is calculated so that a desired exposure amount at that point of time is obtained, and is stored with a certain preset number (the preset number "5", for example) in the preset memory unit 112 (steps S2005, S2006, and S2007 in FIG. 12). As a result, the preset transmittance control value is adaptively updated to a value suitable for the imaging environment.

Particularly, the transmittance control values corresponding to other preset numbers are also rewritten, so that the entire preset becomes suitable for the current imaging environment. Thus, operations in the preset mode become more effective.

In an example described in the fourth embodiment, the transmittance designation unit 110 associates the transmittance control value for designating the transmittance calculated by the exposure amount calculation unit (the AE control unit 106) with a preset number that is a substantial median of preset numbers prepared in a selectable manner, causes the preset memory unit 112 to store the transmittance control value associated with the preset number as the substantial median, and also updates the transmittance control values corresponding to the preset numbers other than the substantially median preset number on the basis of the transmittance control value corresponding to the substantial median.

Specifically, in a case where "1" to "9" are prepared as the preset numbers, for example, when the operation mode is switched from the variable mode to the preset mode, the transmittance control value to be the desired exposure amount at that point of time is stored with the median preset number "5" in the preset memory unit 112, and further, the transmittance control values corresponding to the other preset numbers such as "1" to "4" and "6" to "9" are also rewritten. That is, the transmittance control values corresponding to the preset numbers "1" to "4" and "6" to "9" are updated to values having predetermined variation widths from the preset number "5" (steps S2007 and S2008 in FIG. 12).

In this manner, the entire preset becomes suitable for the current imaging environment. The user can increase or decrease the exposure amount around the median preset number "5" by performing a preset number selecting operation. Thus, operations in the preset mode become more effective and easier to understand.

In the fourth embodiment, the transmittance designation unit 110 causes the preset memory unit 112 to store the transmittance control value for designating the transmittance calculated by the exposure amount calculation unit (the AE control unit 106), and notifies the variable transmittance drive unit 108 of the transmittance control value.

As a result, when the pressing portion 9b is pressed to be switched to the second state, for example, the transmittance of the variable neutral density filter 102 is controlled so that an appropriate exposure amount at that point of time is obtained (step S2009 in FIG. 12). Thus, when the user performs an operation in the preset mode, the optimum exposure state at that point of time is automatically obtained.

Further, in a case where the transmittance control value to be the appropriate exposure amount is associated with the median preset number "5", for example, the user can obtain the exposure state suitable for the current environment by performing an operation in the preset mode, and then appropriately adjust the exposure state by performing a preset number selecting operation. That is, the rotating member 9a is rotated counterclockwise to increase the exposure amount, and is rotated clockwise to decrease the exposure amount, for example, with the reference being the currently optimum exposure state.

In an example described in the first embodiment, the transmittance operator 9 includes the rotating member 9a, and the pressing portion 9b provided on the rotating member 9a, and the first state and the second state are states in which pressed states of the pressing portion 9b are different.

For example, as described above with reference to FIG. 2, in the transmittance operator 9, the positional state in which the pressing portion 9b is not pressed is set as the first state, and a transmittance changing operation in the variable mode is performed by a rotating operation of the rotating member 9a. The positional state in which the pressing portion 9b is pushed in is set as the second state, and a selecting operation in the preset mode is performed by a rotating operation of the rotating member 9a.

That is, the user can perform mode switching with the pressing portion 9b while operating the rotating member 9a. Thus, a mode switching operation and a transmittance changing operation can be performed very easily. For example, even if the user as a camera operator is gazing at the display surface 5a, a viewfinder, or the like, the user does not worry about the mode selection for transmittance control and the operation to change the transmittance.

Further, the mode switching operation is a pressing operation that is clearly different from rotation of the rotating member 9a. Accordingly, the difference from a rotating operation is clear, and an erroneous operation is unlikely to occur.

Note that, in a case where the pressing portion 9b is formed as a push/push switch, a configuration in which the positional state of the pressing portion 9b does not change is also conceivable. In that case, a light emitting unit or the like may indicate that the first state and the second state are switched, for example.

In an example described in the fifth embodiment, the transmittance operator 9 includes the rotating member 9a, and the second state is a state in which the rotating member 9a is moved in the rotation axis direction relative to the first state.

For example, as described above with reference to FIG. 13, in the transmittance operator 9, the state in which the rotating member 9a is not pushed in is set as the first state, and a transmittance changing operation in the variable mode is performed by a rotating operation of the rotating member 9a. The state in which the rotating member 9a is pushed in is set as the second state, and a selecting operation in the preset mode is performed by a rotating operation of the rotating member 9a.

Thus, the user can perform a mode switching operation and a transmittance changing operation both very easily.

Furthermore, the mode switching operation involves movement in the axial direction of the rotating member 9a, which is clearly different from rotation of the rotating member 9a. Thus, the user can perform a mode operation as an operation clearly different from a rotating operation, and an erroneous operation is less likely to occur.

In an example described in the fourth embodiment, the transmittance operator 9 includes the rotating member 9a, and the second state is a state in which the rotating member 9a is moved so that the rotation axis position of the rotating member 9a changes relative to the first state.

For example, as described above with reference to FIG. 11, the transmittance operator 9 has a structure in which the position of the rotating member 9a slides. In that positional state, the transmittance operator 9 enters the first state (a variable mode state) or the second state (a preset mode state). In either case, an operation to change the transmittance is performed by a rotating operation of the rotating member 9a.

Furthermore, the mode selecting operation involves lateral movement of the rotating member 9a, which is clearly different from rotation of the rotating member 9a. Thus, the user can perform a mode operation as an operation clearly different from a rotating operation, and an erroneous operation is less likely to occur.

Note that the transmittance operator 9 includes the rotating member 9a, but an example in which the transmittance operator 9 does not include the rotating member 9a is also conceivable. For example, a slider may be included, and the transmittance may be changed by a slider operation. Alternatively, a button or a key may be adopted, and the transmittance may be changed with the number of times the button or the key is pressed. Further, an example in which the operating unit is formed as a touch panel operating unit is also conceivable.

In an example described in the sixth embodiment, the transmittance operator 9 generates a clicking feeling for each predetermined operation amount in the second state, and the transmittance designation unit 110 changes the transmittance control value directed to the variable transmittance drive unit with another transmittance control value at the clicking timing.

In the case of the preset mode that is set as the second state, preset numbers are switched for each predetermined rotation amount. For example, FIG. 14 shows an example in which a clicking feeling is caused in the user through vibration of the vibration unit 202. However, a clicking feeling may be generated at the timing when preset numbers are switched, so that the user can reliably perceive the preset number switching. This configuration is suitable as an operation guide.

Further, at this clicking timing, which is the timing of switching preset numbers, the transmittance control value corresponding to the new preset number is supplied to the variable transmittance drive unit 108, and the transmittance of the variable neutral density filter 102 actually changes. Thus, the user recognizes the preset number change together with the clicking feeling, and also visually recognizes an actual light quantity change. In this manner, very easy-to-understand operations can be provided.

On the other hand, a clicking feeling is not generated in the variable mode, so that the user suitably adjusts the transmittance in a stepless manner.

Note that, although the transmittance designation unit 110 is included in the imaging apparatus 1 in the examples described in the above embodiments, a device configuration separate from the imaging apparatus 1 can be adopted as the transmittance designation device.

For example, a configuration including the transmittance operator 9 and the transmittance designation unit 110 can be adopted as a remote controller that is capable of designating a transmittance for the imaging apparatus 1.

A program according to an embodiment is a program for causing a CPU, a DSP, or the like, or a device including the CPU, the DSP, or the like, for example, to perform the processes shown in FIG. 5, FIG. 6, FIGS. 7 and 8, or FIGS. 11 and 12.

That is, a program according to an embodiment causes an information processing device to perform: a process of setting a transmittance control value for the variable neutral density filter 102 in accordance with an operation amount of the transmittance operator 9, when the transmittance operator 9 that can be in the first state or in the second state depending on a change in form is in the first state; and a process of selecting the transmittance control value for the variable neutral density filter 102 in accordance with an operation of the transmittance operator 9 from among a plurality of preset and stored transmittance control values, when the transmittance operator 9 is in the second state.

It is assumed that an information processing device such as a microcomputer in the imaging apparatus 1, an information processing device in an operation device (such as a remote controller, for example) independent of the imaging apparatus 1, or the like operates according to such a program.

Such a program can be recorded beforehand in an HDD as a recording medium in a device such as a computer device, a ROM in a microcomputer including a CPU, or the like.

Alternatively, the program can be temporarily or permanently stored (recorded) in a removable recording medium, such as a flexible disk, a compact disc read only memory (CD-ROM), a magnet-optical (MO) disk, a digital versatile disc (DVD), a Blu-ray Disc (registered trademark), a magnetic disk, a semiconductor memory, or a memory card. Such a removable recording medium can be provided as so-called packaged software.

Alternatively, such a program can be installed from a removable recording medium into a personal computer or the like, or can be downloaded from a download site via a network such as a local area network (LAN) or the Internet.

Also, such a program is suitable for providing image processing apparatuses according to the embodiments in a wide range. For example, by downloading the program into a personal computer, a portable information processing device, a mobile telephone, a game device, a video device, a personal digital assistant (PDA), or the like, the personal computer or the like can be made to function as an image processing apparatus of the present disclosure.

Note that the advantageous effects described in this specification are merely examples, and the advantageous effects of the present technology are not limited to them and may include other effects.

Note that the present technology may also be embodied in the configurations described below.

(1)

An imaging apparatus including:

a variable neutral density filter that has a variable transmittance;

an imaging device unit on which object light via the variable neutral density filter forms an image;

a variable transmittance drive unit that changes a transmittance of the variable neutral density filter in accordance with a transmittance control value;

an operating unit that can be in a first state or in a second state depending on a change in form; and a transmittance designation unit that sets the transmittance control value directed to the variable transmittance drive unit in accordance with an operation amount of the operating unit when the operating unit is in the first state, and selects one transmittance control value from among a plurality of transmittance control values in accordance with an operation of the operating unit and sets the one transmittance control value as the transmittance control value directed to the variable transmittance drive unit when the operating unit is in the second state, the plurality of transmittance control values being stored as preset memory.

(2)

The imaging apparatus according to (1), in which, when the operating unit is in the first state, the transmittance designation unit sets the transmittance control value directed to the variable transmittance drive unit in accordance with an operation amount of a specific operation of the operating unit, and, when the operating unit is in the second state, the transmittance designation unit selects one transmittance control value from among the plurality of transmittance control values in accordance with the specific operation of the operating unit and sets the one transmittance control value as the transmittance control value directed to the variable transmittance drive unit, the plurality of transmittance control values being stored as the preset memory.

(3)

The imaging apparatus according to (2), in which the operating unit includes a rotating member, and the specific operation is an operation to rotate the rotating member.

(4)

The imaging apparatus according to (1), further including a preset memory unit that stores the plurality of transmittance control values as the preset memory in a rewritable state.

(5)

The imaging apparatus according to any one of (1) to (4), further including a preset memory unit that stores the plurality of transmittance control values as the preset memory, in which, when the operating unit is switched from the first state to the second state, the transmittance designation unit selects one transmittance control value stored in the preset memory unit.

(6)

The imaging apparatus according to (5), in which, when the operating unit is switched from the first state to the second state, the transmittance designation unit selects a preset number that was selected at last when the operating unit was in the second state last time, and notifies the variable transmittance drive unit of the transmittance control value that is stored and is associated with the preset number in the preset memory unit.

(7)

The imaging apparatus according to (5), in which, when the operating unit is switched from the first state to the second state, the transmittance designation unit notifies the variable transmittance drive unit of the transmittance control value that is stored and is associated with the preset number that was selected at last when the operating unit was in the second state last time.

(8)

The imaging apparatus according to (5), in which, when the operating unit is switched from the first state to the second state, the transmittance designation unit selects the transmittance control value closest to the transmittance control value that was directed to the variable transmittance drive unit in the most recent first state from among the transmittance control values stored in the preset memory unit, and notifies the variable transmittance drive unit of the selected transmittance control value.

(9)

The imaging apparatus according to any one of (1) to (8), further including:

a light quantity detection unit that detects a light quantity of the object light;

an exposure amount calculation unit that calculates a transmittance as a target exposure amount, from the light quantity detected by the light quantity detection unit; and a preset memory unit that stores the plurality of transmittance control values as the preset memory in a rewritable state, in which the transmittance designation unit performs a process of causing the preset memory unit to store a transmittance control value for designating the transmittance calculated by the exposure amount calculation unit.

(10)

The imaging apparatus according to (9), in which the transmittance designation unit associates the transmittance control value for designating the transmittance calculated by the exposure amount calculation unit with a preset number that is a substantial median of preset numbers prepared in a selectable manner, causes the preset memory unit to store the transmittance control value associated with the preset number as the substantial median, and updates transmittance control values corresponding to the preset numbers other than the substantially median preset number on the basis of the transmittance control value corresponding to the substantial median.

(11)

The imaging apparatus according to (9) or (10), in which the transmittance designation unit causes the preset memory unit to store the transmittance control value for designating the transmittance calculated by the exposure amount calculation unit, and notifies the variable transmittance drive unit of the transmittance control value.

(12)

The imaging apparatus according to any one of (1) to (11), in which the operating unit includes: a rotating member; and a pressing portion that is provided on the rotating member, and the first state and the second state are states in which pressed states of the pressing portion are different.

(13)

The imaging apparatus according to any one of (1) to (11), in which the operating unit includes a rotating member, and the second state is a state in which the rotating member is moved in a rotation axis direction relative to the first state.

(14)

The imaging apparatus according to any one of (1) to (11), in which the operating unit includes a rotating member, and the second state is a state in which the rotating member is moved so that a rotation axis position of the rotating member changes relative to the first state.

(15)

The imaging apparatus according to any one of (1) to (14), in which the operating unit generates a clicking feeling for each predetermined operation amount in the second state, and the transmittance designation unit changes the transmittance control value directed to the variable transmittance drive unit with another transmittance control value at a clicking timing.

(16)

A transmittance designation device including
a transmittance designation unit,
in which, when an operating unit that can be in a first state or in a second state depending on a change in form is in the first state, the transmittance designation unit sets a transmittance control value for controlling a variable neutral density filter having a variable transmittance in accordance with an operation amount of the operating unit, and, when the operating unit is in the second state, the transmittance designation unit selects the transmittance control value for controlling the variable neutral density filter in accordance with an operation of the operating unit from among a plurality of transmittance control values stored as preset memory.

(17)

A transmittance control method implemented in an imaging apparatus that includes:
a variable neutral density filter that has a variable transmittance;
an imaging device unit on which object light via the variable neutral density filter forms an image;
a variable transmittance drive unit that changes a transmittance of the variable neutral density filter in accordance with a transmittance control value; and
an operating unit that can be in a first state or in a second state depending on a change in form,
the transmittance control method including:
setting the transmittance control value in accordance with an operation amount of the operating unit and notifying the variable transmittance drive unit of the transmittance control value when the operating unit is in the first state; and
selecting one transmittance control value from among a plurality of transmittance control values in accordance with an operation of the operating unit and notifying the variable transmittance drive unit of the one transmittance control value when the operating unit is in the second state, the plurality of transmittance control values being stored as preset memory.

(18)

A program for causing an information processing device to perform:
a process of setting a transmittance control value for a variable neutral density filter having a variable transmittance in accordance with an operation amount of an operating unit, when the operating unit that can be in a first state or in a second state depending on a change in form is in the first state; and
a process of selecting the transmittance control value for the variable neutral density filter in accordance with an operation of the operating unit from among a plurality of transmittance control values stored as preset memory, when the operating unit is in the second state.

REFERENCE SIGNS LIST

1 Imaging apparatus
2 Housing
3 Main frame unit
4 Panel unit
4a Mount portion
5 Display
5a Display surface
6 Operating unit
7 Grip portion
8 Lens barrel
9 Transmittance operator
9a Rotating member
9b Pressing portion
100 Press detection unit
101 Rotation detection unit
102 Variable neutral density filter
103 Diaphragm
104 Imaging device unit
105 AE detection unit
106 AE control unit
107 Diaphragm control unit
108 Variable transmittance drive unit
109 Auto/manual determination unit
110 Transmittance designation unit
111 Operation information detection unit
112 Preset memory unit
113 Set transmittance calculation unit
114 Transmissive sensor
120 Auto/manual switching unit
121 Image signal processing unit
122 Display unit
123 Recording unit
124 Communication unit
200 Slide detection unit
201 Preset generation unit
202 Vibration unit

The invention claimed is:

1. An imaging apparatus, comprising:
a variable neutral density filter that has a variable transmittance;
an imaging device including a sensor on which object light via the variable neutral density filter forms an image;
variable transmittance drive circuitry configured to change a transmittance of the variable neutral density filter in accordance with a transmittance control value;
a hardware input device that can be in a first state or in a second state depending on a change in form; and
transmittance designation circuitry configured to set a transmittance control value directed to the variable transmittance drive circuitry in accordance with an operation amount of the hardware input device when the hardware input device is in the first state, and select one transmittance control value from among a plurality of transmittance control values in accordance with an operation of the hardware input device and set the one transmittance control value as the transmittance control value directed to the variable transmittance drive circuitry when the hardware input device is in the second state, the plurality of transmittance control values being stored in a preset memory.

2. The imaging apparatus according to claim 1, wherein,
when the hardware input device is in the first state, the transmittance designation circuitry is further configured to set the transmittance control value directed to the variable transmittance drive circuitry in accordance with an operation amount of a specific operation of the hardware input device, and
when the hardware input device is in the second state, the transmittance designation circuitry is further configured to select one transmittance control value from among the plurality of transmittance control values in accordance with the specific operation of the hardware input device and set the one transmittance control value as the transmittance control value directed to the variable transmittance drive circuitry, the plurality of transmittance control values being stored as in the preset memory.

3. The imaging apparatus according to claim 2, wherein
the hardware input device includes a rotating member, and
the specific operation is an operation to rotate the rotating member.

4. The imaging apparatus according to claim 1, further comprising the preset memory that stores the plurality of transmittance control values in a rewritable state.

5. The imaging apparatus according to claim 1, further comprising the preset memory that stores the plurality of transmittance control values,
wherein, when the hardware input device is switched from the first state to the second state, the transmittance designation circuitry is further configured to select one transmittance control value stored in the preset memory.

6. The imaging apparatus according to claim 5, wherein, when the hardware input device is switched from the first state to the second state, the circuitry is further configured to select a preset number that was selected at last when the hardware input device was in the second state last time, and notify the variable transmittance drive circuitry of the transmittance control value that is stored and is associated with the preset number in the preset memory.

7. The imaging apparatus according to claim 5, wherein, when the hardware input device is switched from the first state to the second state, the transmittance designation circuitry is further configured to notify the variable transmittance drive circuitry of the transmittance control value that is stored and is associated with a preset number that was selected at last when the hardware input device was in the second state last time.

8. The imaging apparatus according to claim 5, wherein, when the hardware input device is switched from the first state to the second state, the transmittance designation circuitry is further configured to select a transmittance control value closest to a transmittance control value that was directed to the variable transmittance drive circuitry in the most recent first state from among the transmittance control values stored in the preset memory, and notify the variable transmittance drive circuitry of the selected transmittance control value.

9. The imaging apparatus according to claim 1, further comprising:
light quantity detection circuitry configured to detect a light quantity of the object light;
exposure amount calculation circuitry configured to calculate a transmittance as a target exposure amount, from the light quantity detected by the light quantity detection circuitry; and
the preset memory that stores a plurality of transmittance control values in a rewritable state,
wherein the transmittance designation circuitry is further configured to perform a process of causing the preset memory to store a transmittance control value for designating the transmittance calculated by the exposure amount calculation circuitry.

10. The imaging apparatus according to claim 9, wherein the transmittance designation circuitry is further configured to associate the transmittance control value for designating the transmittance calculated by the exposure amount calculation circuitry with a preset number that is a substantial median of preset numbers prepared in a selectable manner, cause the preset memory to store the transmittance control value associated with the preset number as the substantial median, and update transmittance control values corresponding to the preset numbers other than the substantially median preset number on a basis of the transmittance control value corresponding to the substantial median.

11. The imaging apparatus according to claim 9, wherein the transmittance designation circuitry is further configured to cause the preset memory to store the transmittance control value for designating the transmittance calculated by the exposure amount calculation circuitry, and notify the variable transmittance drive unit of the transmittance control value.

12. The imaging apparatus according to claim 1, wherein the hardware input device includes: a rotating member; and a pressing portion that is provided on the rotating member, and
the first state and the second state are states in which pressed states of the pressing portion are different.

13. The imaging apparatus according to claim 1, wherein the hardware input device includes a rotating member, and
the second state is a state in which the rotating member is moved in a rotation axis direction relative to the first state.

14. The imaging apparatus according to claim 1, wherein the hardware input device includes a rotating member, and
the second state is a state in which the rotating member is moved so that a rotation axis position of the rotating member changes relative to the first state.

15. The imaging apparatus according to claim 1, wherein the hardware input device generates a clicking feeling for each predetermined operation amount in the second state, and
the transmittance designation circuitry is further configured to change the transmittance control value directed to the variable transmittance drive circuitry with another transmittance control value at a clicking timing.

16. A transmittance designation device, comprising:
transmittance designation circuitry,
wherein, when a hardware input device that can be in a first state or in a second state depending on a change in form is in the first state, the transmittance designation circuitry is configured to set a transmittance control value for controlling a variable neutral density filter having a variable transmittance in accordance with an operation amount of the hardware input device, and, when the hardware input device is in the second state, the transmittance designation circuitry is configured to select the transmittance control value for controlling the variable neutral density filter in accordance with an operation of the hardware input device from among a plurality of transmittance control values stored in a preset memory.

17. A transmittance control method implemented in an imaging apparatus that includes a variable neutral density filter that has a variable transmittance; an imaging device including a sensor on which object light via the variable neutral density filter forms an image; variable transmittance drive circuitry configured to change a transmittance of the variable neutral density filter in accordance with a transmittance control value; and a hardware input device that can be in a first state or in a second state depending on a change in form, the transmittance control method including:
setting the transmittance control value in accordance with an operation amount of the hardware input device and notifying the variable transmittance drive circuitry of the transmittance control value when the hardware input device is in the first state; and selecting one transmittance control value from among a plurality of transmittance control values in accordance with an operation of the hardware input device and notifying the variable transmittance drive circuitry of the one transmittance control value when the hardware input device is in the second state, the plurality of transmittance control values being stored in a preset memory.

18. A non-transitory computer-readable medium storing a program that when executed causes an information processing device to perform:

a process of setting a transmittance control value for a variable neutral density filter having a variable transmittance in accordance with an operation amount of an hardware input device, when the hardware input device that can be in a first state or in a second state depending on a change in form is in the first state; and a process of selecting the transmittance control value for the variable neutral density filter in accordance with an operation of the hardware input device from among a plurality of transmittance control values stored in a preset memory, when the hardware input device is in the second state.

\* \* \* \* \*